(12) United States Patent
Haussila et al.

(10) Patent No.: US 12,208,329 B2
(45) Date of Patent: Jan. 28, 2025

(54) SYSTEM AND METHOD FOR CONTROLLING TECHNICAL PROCESSES

(71) Applicant: Supercell Oy, Helsinki (FI)

(72) Inventors: Timur Haussila, Helsinki (FI); Touko Tahkokallio, Helsinki (FI); Mikko Hokkanen, Helsinki (FI); John Nicholas Derome, Helsinki (FI); Lassi Leppinen, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

(21) Appl. No.: 18/210,690

(22) Filed: Jun. 16, 2023

(65) Prior Publication Data

US 2023/0415041 A1    Dec. 28, 2023

Related U.S. Application Data

(63) Continuation of application No. 17/877,154, filed on Jul. 29, 2022, now Pat. No. 11,771,988, which is a
(Continued)

(30) Foreign Application Priority Data

Dec. 7, 2012    (GB) ..................................... 1222096

(51) Int. Cl.
*A63F 13/533*    (2014.01)
*A63F 13/2145*    (2014.01)
(Continued)

(52) U.S. Cl.
CPC ........ *A63F 13/533* (2014.09); *A63F 13/2145* (2014.09); *A63F 13/42* (2014.09);
(Continued)

(58) Field of Classification Search
CPC .... A63F 13/533; A63F 13/2145; A63F 13/04; A63F 13/44; A63F 13/822;
(Continued)

(56) References Cited

U.S. PATENT DOCUMENTS 3,889,051 A * 6/1975 Legler .................... H04N 5/268
                                                  348/460
4,435,776 A * 3/1984 Ratcliffe ................ G09G 1/007
                                                  715/248
(Continued)

OTHER PUBLICATIONS

Nishimoto et al., "Fleet Commander Game for Tactile Multi-touch Display", Electronic Visualization Laboratory, University of Illinois at Chicago, Aug. 25, 2010, Youtube video, Username evltube, URL https://www.youtube.com/watch?V=Y15oerC7GPg.
(Continued)

*Primary Examiner* — Nicholas Augustine
(74) *Attorney, Agent, or Firm* — Ziegler IP Law Group LLC.

(57) ABSTRACT

In a method and a system for improving a user's experience with a graphical user interface corresponding to a gaming or simulation environment on an electronic device, the interface renders multiple graphical objects and user selectable options corresponding to the graphical object. The user selects one or more selectable option, and performs a touching or a swiping operation through multiple points on the display screen. The touching or swiping operation leads to deploying of multiple resources corresponding to the selected option, at different locations on the interface. For controlling the different deployed resources, the user can swipe through different regions of the display screen. The number of resources deployed at the different locations on the screen depends on certain parameters, including the pressure applied by the user on the screen. Results of the
(Continued)

simulation can be employed to control real technical systems, for example for food production.

17 Claims, 16 Drawing Sheets

Related U.S. Application Data continuation of application No. 17/120,535, filed on Dec. 14, 2020, now Pat. No. 11,400,372, which is a continuation of application No. 16/258,913, filed on Jan. 28, 2019, now Pat. No. 10,864,442, which is a continuation of application No. 14/391,229, filed as application No. PCT/IB2013/001126 on Apr. 9, 2013, now Pat. No. 10,198,157, and a continuation-in-part of application No. 13/479,637, filed on May 24, 2012, now Pat. No. 8,814,674, and a continuation-in-part of application No. 13/445,783, filed on Apr. 12, 2012, now Pat. No. 8,954,890.

(51) Int. Cl.
| | | |
|---|---|---|
| *A63F 13/42* | (2014.01) | |
| *A63F 13/44* | (2014.01) | |
| *A63F 13/822* | (2014.01) | |
| *G06F 3/0481* | (2022.01) | |
| *G06F 3/04842* | (2022.01) | |
| *G06F 3/04847* | (2022.01) | |
| *G06F 3/04883* | (2022.01) | |
| *A63F 3/00* | (2006.01) | |
| *A63F 9/24* | (2006.01) | |
| *G06F 3/048* | (2013.01) | |

(52) U.S. Cl.
CPC ............ *A63F 13/44* (2014.09); *A63F 13/822* (2014.09); *G06F 3/0481* (2013.01); *G06F 3/04842* (2013.01); *G06F 3/04847* (2013.01); *G06F 3/04883* (2013.01); *A63F 2003/00996* (2013.01); *A63F 2009/241* (2013.01)

(58) Field of Classification Search
CPC ..... A63F 2003/00996; A63F 2009/241; G06F 3/0481; G06F 3/04842; G06F 3/04847; G06F 3/04883
See application file for complete search history.

(56) References Cited

U.S. PATENT DOCUMENTS

| | | | | |
|---|---|---|---|---|
| 5,208,665 | A * | 5/1993 | McCalley | H04N 21/4755 348/E7.075 |
| 5,284,164 | A * | 2/1994 | Andrews | A24C 5/34 702/179 |
| 5,307,295 | A * | 4/1994 | Taylor | G06F 30/20 703/2 |
| 5,310,349 | A * | 5/1994 | Daniels | G09B 7/00 434/350 |
| 5,317,402 | A * | 5/1994 | Wong | H04N 5/32 378/114 |
| 5,464,946 | A * | 11/1995 | Lewis | G09B 15/00 84/645 |
| 5,471,318 | A * | 11/1995 | Ahuja | H04M 3/567 709/204 |
| 5,574,934 | A * | 11/1996 | Mirashrafi | H04N 21/4143 348/E7.083 |
| 5,586,264 | A * | 12/1996 | Belknap | G06F 3/0601 725/115 |
| 5,594,679 | A * | 1/1997 | Iwata | G06F 17/147 382/250 |
| 5,602,992 | A * | 2/1997 | Danneels | H04J 3/0664 709/248 |
| 5,610,653 | A * | 3/1997 | Abecassis | H04N 21/4728 386/E9.04 |
| 5,649,171 | A * | 7/1997 | Craven | G11B 27/034 715/201 |
| 5,666,293 | A * | 9/1997 | Metz | H04N 21/6543 348/E7.071 |
| 5,668,948 | A * | 9/1997 | Belknap | H04N 21/23 710/316 |
| 5,689,553 | A * | 11/1997 | Ahuja | H04M 3/567 379/202.01 |
| 5,719,786 | A * | 2/1998 | Nelson | H04L 9/40 709/219 |
| 5,745,126 | A * | 4/1998 | Jain | H04N 13/156 348/E13.058 |
| 5,748,866 | A * | 5/1998 | Edgar | G09G 5/14 345/428 |
| 5,761,417 | A * | 6/1998 | Henley | G06F 3/0656 725/117 |
| 5,767,897 | A * | 6/1998 | Howell | H04N 7/15 348/E7.083 |
| 5,790,124 | A * | 8/1998 | Fischer | G06T 15/10 472/75 |
| 5,835,671 | A * | 11/1998 | Kitamura | H04N 21/4348 386/244 |
| 5,845,009 | A * | 12/1998 | Marks | G06T 7/251 348/169 |
| 5,859,623 | A * | 1/1999 | Meyn | G06F 3/14 345/698 |
| 5,867,494 | A * | 2/1999 | Krishnaswamy | H04M 7/0027 379/114.15 |
| 5,949,954 | A * | 9/1999 | Young | G11B 27/34 348/E5.103 |
| 5,966,056 | A * | 10/1999 | Thornton | H04L 5/20 333/236 |
| 5,999,208 | A * | 12/1999 | McNerney | H04N 7/15 348/E7.083 |
| 5,999,698 | A * | 12/1999 | Nakai | H04N 21/4221 348/E5.103 |
| 6,014,503 | A * | 1/2000 | Nagata | G06F 30/13 700/182 |
| 6,016,147 | A * | 1/2000 | Gantt | G06T 19/20 345/419 |
| 6,036,188 | A * | 3/2000 | Gomez | A63F 7/027 273/118 A |
| 6,040,841 | A * | 3/2000 | Cohen | G06T 15/00 345/473 |
| 6,052,648 | A * | 4/2000 | Burfeind | H04N 5/222 348/E5.022 |
| 6,057,829 | A * | 5/2000 | Silfvast | H01H 19/00 345/156 |
| 6,084,168 | A * | 7/2000 | Sitrick | G09B 15/023 84/478 |
| 6,112,011 | A * | 8/2000 | Hisatomi | H04N 21/43072 386/E9.04 |
| 6,118,428 | A * | 9/2000 | Blackmon | G06F 9/451 715/781 |
| 6,133,945 | A * | 10/2000 | Stuettler | H04N 13/239 348/51 |
| 6,165,069 | A * | 12/2000 | Sines | G07F 17/3216 273/274 |
| 6,166,727 | A * | 12/2000 | Kozuka | H04L 9/40 715/204 |
| 6,181,870 | B1 * | 1/2001 | Okada | G11B 7/0037 386/241 |
| 6,191,812 | B1 * | 2/2001 | Tzidon | H04N 9/75 348/E5.022 |
| 6,204,852 | B1 * | 3/2001 | Kumar | G06F 3/017 715/863 |
| 6,215,498 | B1 * | 4/2001 | Filo | G06T 15/00 345/473 |
| 6,257,982 | B1 * | 7/2001 | Rider | A63F 13/48 463/31 |
| 6,335,765 | B1 * | 1/2002 | Daly | H04N 5/2224 348/E5.022 |

(56) References Cited

U.S. PATENT DOCUMENTS

| | | | | |
|---|---|---|---|---|
| 6,346,967 B1* | 2/2002 | Gullichsen | G06T 3/12 | 348/207.99 |
| 6,351,736 B1* | 2/2002 | Weisberg | G06Q 30/02 | 705/14.46 |
| 6,356,971 B1* | 3/2002 | Katz | G11B 27/36 | 710/301 |
| 6,371,849 B1* | 4/2002 | Togami | A63F 13/56 | 273/317.1 |
| 6,381,343 B1* | 4/2002 | Davis | H04N 1/00132 | 348/E17.004 |
| 6,386,985 B1* | 5/2002 | Rackham | A63J 5/021 | 472/75 |
| 6,392,694 B1* | 5/2002 | Bianchi | H04N 7/181 | 348/E7.086 |
| 6,392,760 B1* | 5/2002 | Ahuja | H04M 3/567 | 358/468 |
| 6,394,897 B1* | 5/2002 | Togami | A63F 13/56 | 273/317.1 |
| 6,408,436 B1* | 6/2002 | de Haas | H04N 21/4347 | 725/120 |
| 6,409,599 B1* | 6/2002 | Sprout | A63J 25/00 | 463/31 |
| 6,414,679 B1* | 7/2002 | Miodonski | G06T 13/00 | 707/999.005 |
| 6,525,780 B1* | 2/2003 | Bruno | H04N 5/272 | 348/600 |
| 6,542,549 B1* | 4/2003 | Tan | H04N 19/20 | 375/E7.076 |
| 6,556,773 B2* | 4/2003 | Tsumagari | G11B 27/36 | 386/241 |
| 6,580,872 B1* | 6/2003 | Kikuchi | G11B 27/329 | 386/E5.001 |
| 6,598,233 B1* | 7/2003 | Choi | H04N 21/426 | 725/38 |
| 6,628,892 B2* | 9/2003 | Tsumagari | H04N 9/8042 | |
| 6,632,140 B2* | 10/2003 | Berman | G07F 17/3211 | 463/20 |
| 6,651,985 B2* | 11/2003 | Sines | G07F 17/32 | 463/16 |
| 6,654,031 B1* | 11/2003 | Ito | G11B 27/031 | 345/473 |
| 6,683,619 B1* | 1/2004 | Samra | H04N 5/262 | 700/83 |
| 6,727,925 B1* | 4/2004 | Bourdelais | G06T 15/20 | 715/850 |
| 6,744,403 B2* | 6/2004 | Milnes | G01S 19/41 | 342/357.57 |
| 6,754,904 B1* | 6/2004 | Cooper | H04N 21/44224 | 348/E7.071 |
| 6,755,737 B2* | 6/2004 | Jackson | G07F 17/3267 | 463/16 |
| 6,760,917 B2* | 7/2004 | De Vos | H04N 7/17336 | 348/E7.071 |
| 6,771,303 B2* | 8/2004 | Zhang | H04N 7/144 | 382/118 |
| 6,775,835 B1* | 8/2004 | Ahmad | G06F 9/44526 | 719/310 |
| 6,778,755 B1* | 8/2004 | Moon | H04N 1/00925 | 386/285 |
| 6,791,574 B2* | 9/2004 | Hoch | H04N 5/2224 | 348/E5.022 |
| 6,795,637 B1* | 9/2004 | Moon | G11B 27/329 | 386/285 |
| 6,801,912 B2* | 10/2004 | Moskowitz | G09B 7/00 | 706/14 |
| 6,805,354 B2* | 10/2004 | Martin | F41J 3/0076 | 273/378 |
| 6,826,500 B2* | 11/2004 | Linthicum | G06F 30/00 | 715/702 |
| 6,826,540 B1* | 11/2004 | Plantec | G09B 7/00 | 715/706 |
| 6,831,676 B2* | 12/2004 | Monroe | H04N 7/15 | 348/E7.083 |
| 6,842,670 B2* | 1/2005 | Lin | G06V 40/18 | 701/1 |
| 6,853,398 B2* | 2/2005 | Malzbender | A63F 13/30 | 348/14.09 |
| 6,863,608 B1* | 3/2005 | LeMay | G07F 17/3255 | 463/20 |
| 6,864,886 B1* | 3/2005 | Cavallaro | H04N 5/265 | 348/E5.051 |
| 6,873,785 B2* | 3/2005 | Moon | H04N 1/00925 | 386/285 |
| 6,887,157 B2* | 5/2005 | LeMay | G07F 17/34 | 463/16 |
| 6,894,714 B2* | 5/2005 | Gutta | H04N 7/15 | 348/E7.083 |
| 6,912,429 B1* | 6/2005 | Bilger | G08B 25/008 | 700/277 |
| 6,927,757 B2* | 8/2005 | Junkins | G06F 3/0304 | 345/158 |
| 6,937,266 B2* | 8/2005 | Rui | H04N 7/142 | 348/E7.083 |
| 6,938,029 B1* | 8/2005 | Tien | G06F 16/41 | 348/157 |
| 6,947,966 B1* | 9/2005 | Oko, Jr. | G06Q 20/3678 | 235/382 |
| 6,948,131 B1* | 9/2005 | Neven | H04N 7/15 | 348/E7.083 |
| 6,948,153 B2* | 9/2005 | Bowers | G09B 5/00 | 434/323 |
| 6,950,789 B2* | 9/2005 | Laird | G08G 1/08 | 703/8 |
| 6,954,498 B1* | 10/2005 | Lipton | G06T 7/277 | 375/E7.006 |
| 6,954,728 B1* | 10/2005 | Kusumoto | G06Q 30/0241 | 705/14.12 |
| 6,970,173 B2* | 11/2005 | Ciolac | G09G 5/14 | 345/545 |
| 6,990,288 B2* | 1/2006 | Kikuchi | G11B 27/105 | 386/337 |
| 7,002,584 B2* | 2/2006 | Saito | G06T 13/00 | 463/32 |
| 7,027,713 B1* | 4/2006 | Hallberg | H04N 9/8042 | 386/346 |
| 7,034,776 B1* | 4/2006 | Love | A63F 13/26 | 345/1.3 |
| 7,043,142 B2* | 5/2006 | Kikuchi | G11B 27/3027 | 386/337 |
| 7,050,078 B2* | 5/2006 | Dempski | G01S 3/7864 | 345/9 |
| 7,058,707 B1* | 6/2006 | Cerami | H04L 67/306 | 709/229 |
| 7,059,093 B2* | 6/2006 | Akers | E04B 1/8218 | 52/270 |
| 7,062,722 B1* | 6/2006 | Carlin | G06T 15/10 | 715/848 |
| 7,065,553 B1* | 6/2006 | Chesley | A63F 13/358 | 709/219 |
| 7,071,970 B2* | 7/2006 | Benton | G01C 21/20 | 701/28 |
| 7,082,572 B2* | 7/2006 | Pea | G11B 27/105 | 715/720 |
| 7,091,928 B2* | 8/2006 | Rajasingham | G06F 3/013 | 345/9 |
| 7,124,164 B1* | 10/2006 | Chemtob | H04L 12/1822 | 709/204 |
| 7,162,054 B2* | 1/2007 | Meisner | G01S 5/16 | 348/169 |
| 7,164,076 B2* | 1/2007 | McHale | G10H 3/125 | 84/645 |
| 7,168,084 B1* | 1/2007 | Hendricks | H04N 21/235 | 348/E5.103 |
| 7,170,897 B2* | 1/2007 | Mackiewich | H04L 12/1836 | 370/401 |
| 7,176,981 B2* | 2/2007 | Sloo | H04N 5/44504 | 725/38 |

(56) References Cited

U.S. PATENT DOCUMENTS

| | | | |
|---|---|---|---|
| 7,203,310 B2* | 4/2007 | England | G06F 21/64 713/153 |
| 7,203,667 B2* | 4/2007 | Higgins | G06N 5/00 706/45 |
| 7,207,053 B1* | 4/2007 | Asmussen | H04N 21/812 725/35 |
| 7,209,473 B1* | 4/2007 | Mohaban | H04M 3/2254 709/239 |
| 7,209,644 B2* | 4/2007 | Kikuchi | H04N 9/8042 |
| 7,209,645 B2* | 4/2007 | Kikuchi | H04N 5/76 |
| 7,215,322 B2* | 5/2007 | Genc | G06F 3/011 345/157 |
| 7,215,875 B2* | 5/2007 | Kikuchi | G11B 27/034 |
| 7,221,794 B1* | 5/2007 | Gloudemans | G06T 7/11 382/176 |
| 7,239,803 B2* | 7/2007 | Akita | G11B 19/02 386/326 |
| 7,255,351 B2* | 8/2007 | Yoseloff | G07F 17/3276 273/274 |
| 7,255,642 B2* | 8/2007 | Sines | G07F 17/32 463/16 |
| 7,257,315 B2* | 8/2007 | Kikuchi | G11B 27/3027 386/241 |
| 7,263,278 B2* | 8/2007 | Kikuchi | G11B 27/034 |
| 7,269,336 B2* | 9/2007 | Kikuchi | G11B 27/34 386/323 |
| 7,277,572 B2* | 10/2007 | MacInnes | G06Q 10/103 382/284 |
| 7,286,750 B2* | 10/2007 | Kikuchi | G11B 27/3027 |
| 7,292,777 B2* | 11/2007 | Kikuchi | H04N 5/76 386/E9.013 |
| 7,292,778 B2* | 11/2007 | Kikuchi | H04N 9/8042 386/E9.013 |
| 7,292,779 B2* | 11/2007 | Kikuchi | G11B 27/3027 386/E9.013 |
| 7,295,760 B2* | 11/2007 | Kikuchi | G11B 27/329 386/241 |
| 7,298,930 B1* | 11/2007 | Erol | G11B 27/28 707/999.001 |
| 7,305,172 B2* | 12/2007 | Kikuchi | H04N 5/76 386/323 |
| 7,321,565 B2* | 1/2008 | Todd | H04L 65/1101 370/235 |
| 7,349,005 B2* | 3/2008 | Rui | H04N 7/188 348/E7.086 |
| 7,349,008 B2* | 3/2008 | Rui | H04N 7/185 348/E7.086 |
| 7,356,763 B2* | 4/2008 | Lin | G06F 16/48 715/205 |
| 7,363,591 B2* | 4/2008 | Goldthwaite | H04N 21/4312 715/764 |
| RE40,293 E* | 5/2008 | Utterback | G06F 3/005 345/629 |
| 7,373,377 B2* | 5/2008 | Altieri | G06T 19/006 709/204 |
| 7,392,532 B2* | 6/2008 | White | H04N 21/8543 725/135 |
| 7,403,697 B2* | 7/2008 | Kikuchi | H04N 5/76 386/241 |
| 7,412,389 B2* | 8/2008 | Yang | G06T 13/80 345/473 |
| 7,428,000 B2* | 9/2008 | Cutler | H04N 7/15 348/E7.083 |
| 7,429,983 B2* | 9/2008 | Islam | H04N 9/3102 725/111 |
| 7,433,327 B2* | 10/2008 | Harville | H04N 7/147 370/252 |
| 7,447,241 B2* | 11/2008 | Fujii | H04N 21/4392 370/542 |
| 7,493,647 B2* | 2/2009 | White | H04N 7/17318 725/89 |
| 7,523,411 B2* | 4/2009 | Carlin | G06Q 30/02 715/764 |
| 8,244,804 B1* | 8/2012 | Casselman | A63F 13/46 707/705 |
| 8,540,570 B2* | 9/2013 | Janis | A63F 13/52 463/31 |
| 8,795,080 B1* | 8/2014 | Omi | A63F 13/25 715/835 |
| 2001/0000118 A1* | 4/2001 | Sines | G07F 17/3211 273/274 |
| 2001/0000778 A1* | 5/2001 | Sines | G07F 17/32 273/309 |
| 2001/0016519 A1* | 8/2001 | Choe | A63F 13/71 463/42 |
| 2001/0017671 A1* | 8/2001 | Pleven | H04N 5/2723 348/518 |
| 2001/0033619 A1* | 10/2001 | Hanamura | H04N 19/90 375/E7.206 |
| 2001/0049625 A1* | 12/2001 | Mowry | G06Q 30/02 705/14.46 |
| 2001/0055397 A1* | 12/2001 | Norris | G10K 15/02 381/160 |
| 2002/0002072 A1* | 1/2002 | Sines | G07F 17/3216 463/12 |
| 2002/0007488 A1* | 1/2002 | Kikinis | H04H 60/72 725/40 |
| 2002/0016967 A1* | 2/2002 | Carlile | H04N 7/18 725/78 |
| 2002/0032546 A1* | 3/2002 | Imamura | G06F 30/13 705/26.1 |
| 2002/0044153 A1* | 4/2002 | Hoch | H04N 21/434 348/E5.022 |
| 2002/0044683 A1* | 4/2002 | Deshpande | H04N 5/2723 382/165 |
| 2002/0056120 A1* | 5/2002 | McTernan | H04L 65/756 348/E13.071 |
| 2002/0065119 A1* | 5/2002 | Togami | A63F 13/812 463/4 |
| 2002/0097980 A1* | 7/2002 | Rudolph | G11B 27/034 386/281 |
| 2002/0112002 A1* | 8/2002 | Abato | H04N 21/25891 709/219 |
| 2002/0132216 A1* | 9/2002 | Dohrmann | G09B 5/00 434/362 |
| 2002/0147991 A1* | 10/2002 | Furlan | H04N 7/088 348/42 |
| 2002/0171204 A1* | 11/2002 | Martin | F41J 3/0076 273/378 |
| 2002/0171686 A1* | 11/2002 | Kamen | H04N 21/482 348/E5.103 |
| 2002/0190991 A1* | 12/2002 | Efran | H04N 5/2625 345/475 |
| 2002/0196327 A1* | 12/2002 | Rui | H04N 7/188 348/E7.086 |
| 2002/0196343 A1* | 12/2002 | Navab | H04N 7/18 348/169 |
| 2003/0023686 A1* | 1/2003 | Beams | G09B 5/14 709/205 |
| 2003/0031993 A1* | 2/2003 | Pugh | G09B 23/34 434/262 |
| 2003/0032479 A1* | 2/2003 | LeMay | A63F 13/00 463/32 |
| 2003/0037109 A1* | 2/2003 | Newman | H04L 12/1822 709/204 |
| 2003/0041064 A1* | 2/2003 | Moskowitz | G09B 7/00 |
| 2003/0057884 A1* | 3/2003 | Dowling | A63F 13/285 315/291 |
| 2003/0073412 A1* | 4/2003 | Meade, II | G08C 17/02 455/3.03 |
| 2003/0105763 A1* | 6/2003 | Chatfield | H04L 9/40 |
| 2003/0108047 A1* | 6/2003 | Mackiewich | H04L 12/462 370/395.1 |
| 2003/0108241 A1* | 6/2003 | Colmenarez | G06F 16/58 382/181 |
| 2003/0115211 A1* | 6/2003 | Chen | G06F 16/29 707/999.102 |

(56) References Cited

U.S. PATENT DOCUMENTS

| | | | |
|---|---|---|---|
| 2003/0117487 A1* | 6/2003 | Monroe | H04M 3/567 348/E7.083 |
| 2003/0138765 A1* | 7/2003 | Bowers | G09B 5/06 434/322 |
| 2003/0167442 A1* | 9/2003 | Hagerty | G06F 40/117 715/201 |
| 2003/0177019 A1* | 9/2003 | Santos | G06Q 10/10 705/319 |
| 2003/0184681 A1* | 10/2003 | Kriegman | G03B 15/10 348/E5.058 |
| 2003/0212735 A1* | 11/2003 | Hicok | H04L 69/329 709/201 |
| 2003/0215103 A1* | 11/2003 | Norris | H04S 1/002 381/77 |
| 2003/0227542 A1* | 12/2003 | Zhang | G02B 27/017 348/E13.041 |
| 2003/0231857 A1* | 12/2003 | Green | H04N 21/4758 386/281 |
| 2003/0234346 A1* | 12/2003 | Kao | G06F 3/0428 250/221 |
| 2003/0234859 A1* | 12/2003 | Malzbender | H04N 21/23412 348/14.05 |
| 2004/0018007 A1* | 1/2004 | Akita | G11B 27/002 |
| 2004/0019532 A1* | 1/2004 | Waldman | G06Q 20/10 705/14.1 |
| 2004/0023198 A1* | 2/2004 | Youngman | G09B 5/065 434/262 |
| 2004/0032410 A1* | 2/2004 | Ryan | G06T 15/20 345/473 |
| 2004/0034666 A1* | 2/2004 | Chen | G06F 16/29 706/62 |
| 2004/0054513 A1* | 3/2004 | Laird | G08G 1/164 703/8 |
| 2004/0086269 A1* | 5/2004 | Huang | H04N 9/8205 386/E9.036 |
| 2004/0104935 A1* | 6/2004 | Williamson | G06V 10/10 715/757 |
| 2004/0105004 A1* | 6/2004 | Rui | H04N 7/181 348/E7.086 |
| 2004/0113885 A1* | 6/2004 | Genc | G06F 3/011 345/156 |
| 2004/0117446 A1* | 6/2004 | Swanson | H04L 65/4038 709/205 |
| 2004/0119662 A1* | 6/2004 | Dempski | G06F 3/011 345/8 |
| 2004/0131232 A1* | 7/2004 | Meisner | G01S 5/16 382/103 |
| 2004/0179107 A1* | 9/2004 | Benton | G01C 21/20 348/211.99 |
| 2004/0193441 A1* | 9/2004 | Altieri | A63F 13/216 709/203 |
| 2004/0205478 A1* | 10/2004 | Lin | G06F 16/40 715/202 |
| 2004/0205816 A1* | 10/2004 | Barrett | H04N 21/4312 348/E7.054 |
| 2004/0207723 A1* | 10/2004 | Davis | H04N 7/148 348/E7.056 |
| 2004/0207823 A1* | 10/2004 | Alasaarela | H04N 13/337 348/E13.058 |
| 2004/0223497 A1* | 11/2004 | Sanderson | H04L 12/4641 370/395.52 |
| 2004/0223498 A1* | 11/2004 | Sanderson | H04L 12/4641 370/465 |
| 2004/0223499 A1* | 11/2004 | Sanderson | H04L 12/4641 370/395.52 |
| 2004/0223500 A1* | 11/2004 | Sanderson | H04L 12/4641 370/395.53 |
| 2004/0235469 A1* | 11/2004 | Krug | H04W 84/12 455/431 |
| 2004/0236593 A1* | 11/2004 | Swanson | H04L 65/1101 348/E7.083 |
| 2004/0242294 A1* | 12/2004 | Shiozawa | A63F 13/828 463/9 |
| 2004/0251630 A1* | 12/2004 | Sines | G07F 17/32 273/274 |
| 2004/0263636 A1* | 12/2004 | Cutler | H04N 7/15 348/211.3 |
| 2004/0264939 A1* | 12/2004 | Hua | H04N 1/32101 386/280 |
| 2004/0268147 A1* | 12/2004 | Wiederin | H04L 63/0218 726/23 |
| 2005/0035548 A1* | 2/2005 | Yoseloff | G07F 17/32 273/274 |
| 2005/0038692 A1* | 2/2005 | Kane | G06Q 99/00 705/7.32 |
| 2005/0050103 A1* | 3/2005 | Kesteloot | H04N 21/47214 |
| 2005/0059488 A1* | 3/2005 | Larsen | A63F 13/213 463/36 |
| 2005/0066339 A1* | 3/2005 | Thoen | H04N 21/234309 719/328 |
| 2005/0073102 A1* | 4/2005 | Yoseloff | G07F 17/3293 273/292 |
| 2005/0078172 A1* | 4/2005 | Harville | H04N 7/142 348/14.09 |
| 2005/0088407 A1* | 4/2005 | Bell | H04N 21/4223 345/156 |
| 2005/0094968 A1* | 5/2005 | Green | G11B 27/034 386/290 |
| 2005/0094972 A1* | 5/2005 | Green | G11B 27/34 386/E5.064 |
| 2005/0105893 A1* | 5/2005 | Kikuchi | H04N 5/76 386/241 |
| 2005/0151743 A1* | 7/2005 | Sitrick | G09G 5/377 345/670 |
| 2005/0153776 A1* | 7/2005 | LeMay | G07F 17/3223 463/30 |
| 2005/0175197 A1* | 8/2005 | Melchior | H04R 3/12 381/310 |
| 2005/0177463 A1* | 8/2005 | Crutchfield | G06Q 30/06 705/27.2 |
| 2005/0188328 A1* | 8/2005 | Sezan | H04L 12/282 715/201 |
| 2005/0193343 A1* | 9/2005 | Kawabe | H04N 5/222 348/E5.022 |
| 2005/0212910 A1* | 9/2005 | Singhal | H04H 20/89 348/E5.022 |
| 2005/0216346 A1* | 9/2005 | Kusumoto | G06Q 30/0267 705/14.15 |
| 2005/0221263 A1* | 10/2005 | Vecerina | G09B 23/285 434/262 |
| 2005/0232465 A1* | 10/2005 | Braune | G06V 20/52 382/103 |
| 2005/0248508 A1* | 11/2005 | Seong | G09G 3/2044 345/63 |
| 2005/0248577 A1* | 11/2005 | Birdwell | G06T 13/40 345/474 |
| 2005/0262201 A1* | 11/2005 | Rudolph | H04L 12/1831 709/205 |
| 2005/0264555 A1* | 12/2005 | Zhou | G06F 3/04815 345/419 |
| 2005/0267900 A1* | 12/2005 | Ahmed | G06Q 10/00 |
| 2005/0276444 A1* | 12/2005 | Zhou | G06F 3/04815 382/103 |
| 2005/0285933 A1* | 12/2005 | Rui | H04N 7/142 348/E7.083 |
| 2005/0288078 A1* | 12/2005 | Cheok | A63F 13/65 463/1 |
| 2006/0004476 A1* | 1/2006 | Ferren | G05B 19/4099 700/119 |
| 2006/0005136 A1* | 1/2006 | Wallick | H04M 9/082 715/726 |
| 2006/0009979 A1* | 1/2006 | McHale | A63F 13/814 704/270 |
| 2006/0028476 A1* | 2/2006 | Sobel | G06T 13/00 345/474 |
| 2006/0029198 A1* | 2/2006 | Dorneich | A61B 5/02055 379/88.22 |

(56) References Cited

U.S. PATENT DOCUMENTS

| | | | | |
|---|---|---|---|---|
| 2006/0034369 A1* | 2/2006 | Mohsenian | H04N 19/103 | 375/240.03 |
| 2006/0034522 A1* | 2/2006 | Mohsenian | H04N 19/61 | 375/E7.134 |
| 2006/0034535 A1* | 2/2006 | Koch | E02F 9/26 | 382/284 |
| 2006/0044307 A1* | 3/2006 | Song | G06T 11/206 | 345/419 |
| 2006/0047843 A1* | 3/2006 | Julia | H04L 67/303 | 709/231 |
| 2006/0067341 A1* | 3/2006 | Barber | H04L 12/2854 | 370/465 |
| 2006/0069970 A1* | 3/2006 | Bowers | G09B 7/00 | 714/724 |
| 2006/0075429 A1* | 4/2006 | Istvan | H04N 7/163 | 725/39 |
| 2006/0114355 A1* | 6/2006 | Sloo | H04N 5/44504 | 348/584 |
| 2006/0150530 A1* | 7/2006 | Davey | E04H 3/22 | 52/7 |
| 2006/0184977 A1* | 8/2006 | Mueller | H04N 21/4788 | 348/E7.071 |
| 2006/0192852 A1* | 8/2006 | Rosenthal | G06F 3/0346 | 348/61 |
| 2006/0197764 A1* | 9/2006 | Yang | G06T 13/80 | 345/473 |
| 2006/0203103 A1* | 9/2006 | Shiota | H04N 1/32106 | 348/231.2 |
| 2006/0204207 A1* | 9/2006 | Gilge | G08B 13/19676 | 348/E7.086 |
| 2006/0205472 A1* | 9/2006 | Sines | G07F 17/32 | 463/43 |
| 2006/0218042 A1* | 9/2006 | Cruz | G06Q 30/02 | 705/15 |
| 2006/0250417 A1* | 11/2006 | Stauffer | G06F 12/12 | 345/619 |
| 2006/0250520 A1* | 11/2006 | Han | H04N 19/61 | 375/E7.031 |
| 2006/0258446 A1* | 11/2006 | Nguyen | G07F 17/3276 | 463/30 |
| 2006/0288036 A1* | 12/2006 | Sadovsky | G06F 16/41 | 707/999.102 |
| 2007/0011702 A1* | 1/2007 | Vaysman | H04N 21/4828 | 348/E7.071 |
| 2007/0040889 A1* | 2/2007 | Sahashi | G06Q 30/02 | 348/14.01 |
| 2007/0050828 A1* | 3/2007 | Renzi | H04N 7/163 | 348/E7.071 |
| 2007/0055976 A1* | 3/2007 | Ward | H04L 41/0893 | 719/329 |
| 2007/0070069 A1* | 3/2007 | Samarasekera | G06F 3/011 | 707/E17.013 |
| 2007/0073779 A1* | 3/2007 | Walker | H04N 21/631 | |
| 2007/0082729 A1* | 4/2007 | Letovsky | A63F 13/45 | 463/23 |
| 2007/0101398 A1* | 5/2007 | Islam | G02B 26/0808 | 725/151 |
| 2007/0110298 A1* | 5/2007 | Graepel | G06V 40/28 | 345/619 |
| 2007/0111793 A1* | 5/2007 | Miller | G07F 17/32 | 463/40 |
| 2007/0186230 A1* | 8/2007 | Foroutan | G06Q 30/0212 | 463/40 |
| 2007/0186235 A1* | 8/2007 | Jarman | H04N 21/8456 | 348/E7.071 |
| 2007/0192641 A1* | 8/2007 | Nagendra | G06F 1/3203 | 713/320 |
| 2007/0242066 A1* | 10/2007 | Levy Rosenthal | H04N 5/272 | 345/419 |
| 2007/0244769 A1* | 10/2007 | Boesel | G06Q 30/0601 | 705/26.1 |
| 2007/0248261 A1* | 10/2007 | Zhou | G06T 19/006 | 382/154 |
| 2007/0258698 A1* | 11/2007 | Okada | H04N 5/85 | 386/E5.064 |
| 2007/0261000 A1* | 11/2007 | Hellwig | B60K 35/00 | 715/810 |
| 2007/0265091 A1* | 11/2007 | Aguilar, Jr. | A63F 13/45 | 463/42 |
| 2007/0266123 A1* | 11/2007 | Johannesson | H04L 12/2812 | 709/220 |
| 2007/0270172 A1* | 11/2007 | Kalley | H04L 12/1822 | 455/518 |
| 2007/0282997 A1* | 12/2007 | Trochman | G08C 19/00 | 709/224 |
| 2008/0009350 A1* | 1/2008 | Ganz | G06Q 30/0258 | 463/42 |
| 2008/0015003 A1* | 1/2008 | Walker | A63F 13/12 | 463/1 |
| 2008/0020848 A1* | 1/2008 | Muir | G07F 17/3262 | 463/42 |
| 2008/0036756 A1* | 2/2008 | Gaos | G06F 16/954 | 345/418 |
| 2008/0042354 A1* | 2/2008 | Yoseloff | G07F 17/3216 | 273/292 |
| 2008/0060499 A1* | 3/2008 | Sitrick | G09B 15/002 | 84/477 R |
| 2008/0066007 A1* | 3/2008 | Lau | G06F 3/0481 | 715/783 |
| 2008/0076556 A1* | 3/2008 | Icart | A63F 13/335 | 463/32 |
| 2008/0090659 A1* | 4/2008 | Aguilar | A63F 13/30 | 463/42 |
| 2008/0095228 A1* | 4/2008 | Hannuksela | H04N 19/34 | 375/240.01 |
| 2008/0097762 A1* | 4/2008 | Kunz | G06F 40/174 | 704/E15.045 |
| 2008/0147430 A1* | 6/2008 | Hawthorne | G06Q 30/02 | 705/1.1 |
| 2008/0148307 A1* | 6/2008 | Nielsen | H04H 60/32 | 348/E17.005 |
| 2008/0163089 A1* | 7/2008 | Altieri | G03H 1/0005 | 715/764 |
| 2008/0172680 A1* | 7/2008 | Gyorfi | A63F 13/30 | 719/318 |
| 2008/0183820 A1* | 7/2008 | Golovchinsky | H04L 12/2829 | 709/205 |
| 2008/0192116 A1* | 8/2008 | Tamir | G06T 7/292 | 348/157 |
| 2008/0215971 A1* | 9/2008 | Gillo | A63F 13/31 | 709/204 |
| 2008/0243278 A1* | 10/2008 | Dalton | H04S 7/304 | 704/E21.003 |
| 2008/0263432 A1* | 10/2008 | Newcomb | G06F 3/016 | 715/200 |
| 2008/0270446 A1* | 10/2008 | Gossweiler | H04N 21/252 | 707/999.102 |
| 2009/0149259 A1* | 6/2009 | Van Luchene | A63F 13/80 | 463/42 |
| 2012/0083330 A1* | 4/2012 | Ocko | A63F 13/798 | 463/43 |
| 2012/0083336 A1* | 4/2012 | Ocko | A63F 13/497 | 463/31 |
| 2013/0141373 A1* | 6/2013 | Takuma | G06F 3/04883 | 345/173 |
| 2013/0178281 A1* | 7/2013 | Ayyar | A63F 13/67 | 463/30 |
| 2016/0110056 A1* | 4/2016 | Hong | G06F 3/04883 | 715/768 |
| 2016/0364107 A1* | 12/2016 | Yim | G06F 3/04817 | |

OTHER PUBLICATIONS

Nishimoto., "Fleet Commander", Electronic Visualization Laboratory, University of Illinois at Chicago, Youtube video, Username

(56) References Cited

OTHER PUBLICATIONS evltube Jul. 11, 2011, URL: https://www.youtube.com/watch?v=6V0o3TjB2Tw.
Author Unknown, "Restaurant Story", Iphone, Ipad App, Game Guide, Cosmic Publishing Ltd., Mar. 19, 2011, 2 pages.
Japan Patent Office, Notice of Reason of Refusal, Application No. 2022157472, issued Jul. 12, 2023, 4 pages.

* cited by examiner

SYSTEM AND METHOD FOR CONTROLLING TECHNICAL PROCESSES

FIELD OF THE INVENTION

The aspects of the disclosed embodiments relate to systems for controlling technical processes, for example to systems for controlling technical processes relating to at least one of technical process simulation and technical process control. Moreover, the aspects of the disclosed embodiments concerns methods of controlling technical processes, for example to methods of controlling technical processes relating to at least one of technical process simulation and technical process control. Furthermore, the aspects of the disclosed embodiments relate to software products recorded on machine-readable data storage media, wherein the software products are executable upon computing hardware for implementing aforesaid methods.

BACKGROUND OF THE INVENTION

Graphical user interfaces (GUI) for controlling complex processes are known, for example in control rooms associated with nuclear power plant, in military defence systems and in aviation management. Such graphical user interfaces can be employed both to control real technical facilities as well as simulations of such facilities. The simulations provide an opportunity to investigate a potential behaviour of the facilities, prior to applying actual control signals and commands to the facilities, thereby providing better control of the facilities an anticipating behaviour of the facilities.

Computing devices include tablet computers such as iPads, and smart phones, including Apple's iPhone®, Google's Android® phone, and Symbian® phones. These computing devices have extremely user-friendly graphical interfaces, for enabling easy and quick interaction to users thereof. Most of these devices incorporate touch-sensitive screens that obtain user's inputs and facilitate smooth user interaction. Simulation software, for example conveniently implemented in a form of gaming software, is employed in many of these devices for leisure purpose as well as technical control purposes as aforementioned. An important aspect of a gaming or simulation system is the ease with which a given user can enter desired inputs and interact with the user interface of the device on which he/she plays a game and/or executes a simulation. For devices that lack a touch-screen facility incorporated therein, the only possible ways of interaction of the given user while playing a game or executing a simulation on such devices, is by clicking an associated mouse, using associated keyboard functions/keys to operate, or using associated joysticks. Experiences with the 'point and click' or 'joystick' incorporated in many lower-grade electronic devices is incompatible and often time consuming, while playing a game or executing a technical simulation. Specifically, there are specific games or technical simulations where a given user/player needs to use clicking, pointing, tapping and dragging operations many times, and often at different device display locations, which is hard to operate through a contemporary mouse or a contemporary joystick. In a typical gaming environment, where a given user needs to perform similar operations by clicking or touching on multiple points on the interface, this becomes cumbersome. Even the touch-sensitive screens, provided in many conventional electronic devices, are capable of sensing the touching operation only at one point at a time. Multi-touch screens are still not popular, and they can be of great benefit in a gaming environment or a simulation environment. Some of the conventional gaming console applications can be controlled through multi-touch sensitive operations, however, in strategic gaming environments, for performing certain desired operations, they still have some drawbacks.

Therefore, considering the aforementioned problems, there exists a need for a better and highly congenial graphical user interface (GUI) for a gaming or technical simulation-and-control system, while playing a game or executing a simulation on a computing device.

SUMMARY

The aspects of the disclosed embodiments seek to provide an improved user graphical interface which is more convenient to employ when undertaking gaming activities and/or executing simulations of real technical systems before proceeding to control operation of such technical systems.

The aspects of the disclosed embodiments also seek to provide an improved method of employing a user graphical interface which is more convenient when undertaking gaming activities and/or executing simulations of real technical systems before proceeding to control operation of such systems.

According to a first aspect of the disclosed embodiments, there is provided an electronic device as claimed in claim 1: there is provided an electronic device comprising:
  a touch-sensitive display screen, configured to simultaneously sense touching operations performed at multiple points of the screen;
  a computing hardware operable to execute a software product, wherein executing the software product results in generating and rendering a graphical user interface on the display screen, the graphical user interface being configured to facilitate user interaction; the graphical user interface, when rendered, presenting:
  one or more graphical objects; and
  one or more user selectable options, each option representing one or more resources for performing an operation on one or more of the one or more graphical objects; wherein
    based on a user's selection of one or more of the user selectable options, the software product is configured to render the one or more resources corresponding to the selected user selectable option, at multiple locations of the interface.

The aspects of the disclosed embodiments is of advantage in that the graphical user interface is more convenient to employ, for example when submitting complex instructions requiring concurrent deployment activities.

Optionally, in the electronic device, the software product is configured to execute actions through the one or more resources, on one or more graphical objects, based on receiving a user's execution input, after rendering the one or more resources at multiple locations.

Optionally, in the electronic device, the software product is configured to render the one or more resources at multiple locations, based on a user's touching operation at multiple points of the display screen, or a user's swiping operation through the multiple points, the multiple points corresponding to the multiple locations on the display screen. More optionally, in the electronic device, the software is configured to render the one or more resources at multiple locations when the user's touching operation at the multiple points is performed for a pre-determined time. Yet more optionally, in the electronic device, the pre-determined time is user-adjustable. More optionally, in the electronic device, the rapidity of rendering the one or more resources at multiple locations is based at least on the speed of the user's touching operation or the swiping operation on the display screen.

More optionally, in the electronic device, the number of resources rendered at multiple locations depends at least on the pressure applied by the user over the display screen, during performing the touching or swiping operation. Pressure applied by a given user to a touch-screen is beneficially determined by one or more pressure-sensitive transducers integrated into the touch-screen. However, certain contemporary touch-screens operate only on a binary basis, namely either there is contact or no contact with a given area of the touch-screen. In such touch-screens, pressure applied by the given user can be determined by an area of neighbouring spatially contiguous sensing points on the screen which substantially simultaneously experience a contact being made by the given user. Thus, progressively more spatially contiguous sensing points are substantially simultaneously in contact state as progressively more pressure is applied due to elastic deformation of biological tissue of the given user's finger tips. A similar pressure sensing functionality can be achieved when the given user employs a pointing device having an elastically deformable end to contact onto the touch-screen to control a game or a simulation, or to enter commands for controlling a real technical facility. Optionally, the game or simulation includes a calibration routine for a given user to perform to calibrate pressure sensitivity of the touch-screen.

Optionally, in the electronic device, the software product and the graphical user interface corresponds to a gaming environment. More optionally, in the electronic device, the gaming system corresponds to a war-based game, the graphical user interface corresponding to a battlefield, and the one or more resources corresponding to weapons of use within the battlefield. For example, the gaming environment can be a simulation, prior to implementing a military operation in practice using real technical hardware.

Optionally, in the electronic device, there is including a database for continuously recording and updating the change in status of the one or more graphical objects, the software product being coupled to the database and being configured to resume the status of the one or more graphical objects to their last updated status in the database, in case of interruptions in the operable state of the graphical user interface.

Optionally, a plurality of electronic devices are connected to a server through a network, the graphical user interface being generated temporally concurrently on each of the electronic devices, to facilitate a plurality of users' interaction with the graphical user interface, wherein the graphical user interfaces generated on the plurality of electronic devices are coordinated and synchronized through the server, and updated concurrently on the plurality of electronic devices with time.

Optionally, the electronic device is implemented as a desktop computer, a laptop computer, an iPad, or a smart phone, including an iPhone®, an Android® phone or a Symbian® phone; "®" denotes registered trademarks.

According to a second aspect of the invention, there is provided a method of facilitating user interactions with a graphical user interface, the graphical interface being generated and rendered on the display of an electronic device, by executing a software product on a computing hardware of the electronic device, the method comprising:
(a) rendering one or more graphical objects, and one or more user-selectable options corresponding to the one or more graphical objects on the graphical user interface, each user-selectable options corresponding to one or more resources to be deployed on the interface;
(b) selecting one or more of the user-selectable options, and performing one of a touching operation at different points on the display, and a swiping operation through the different points of the display; and
(c) deploying the one or more resource corresponding to the selected user-selectable option at multiple locations on the interface simultaneously, the multiple locations corresponding to the different points where the touching operation, or through which the swiping operation, is being performed.

Optionally, the method further comprises:
(d) deploying the one or more resources at multiple locations based at least on detecting that the touching operation at the multiple points on the display screen is performed for a pre-determined time.

Optionally, in the method, the rapidity of deployment of the one or more resources at multiple locations depends on the speed of the swiping operation or the touching operation.

Optionally, in the method, the number of resources deployed at the different locations on the interface depends on the pressure applied on the display screen during performing the touching operation or the swiping operation.

Optionally, in the method, the software product and the graphical user interface corresponds to a gaming system. More optionally, in the method, the gaming system corresponds to a war-based game, the graphical user interface corresponds to a battlefield, and the one or more resources correspond to weapons of use within the battlefield.

Optionally, the method further comprises continuously recording and updating the change in status of the one or more graphical objects, coupling the software product to the database, and resuming the status of one or more graphical objects to their last updated status in the database, in case of interruptions in the operations of the graphical user interface.

Optionally, the method further comprises:
(e) connecting a plurality of the electronic devices to a server through a network;
(f) generating the graphical user interface temporally concurrently on the displays of the different electronic devices; and
(g) coordinating the plurality of graphical user interfaces through the server, and updating them concurrently with time, to facilitate multiple users' interaction and coordination with the graphical user interfaces.

More optionally, in the method, the graphical user interfaces correspond to a gaming system, and the method is configured to facilitate an online multiplayer gaming system.

According to a third aspect of the disclosed embodiments, there is provided a software product recorded on a machine readable data storage medium, wherein the software product is executable on the computing hardware of a computing device for implementing a method according to the second aspect of the invention.

According to a fourth aspect of the disclosed embodiments, there is provided an electronic device comprising:
a display screen;
a computing hardware capable of executing a software product, wherein executing the software product leads to generating and rendering a graphical user interface on the display screen, the graphical user interface being configured to facilitate easy user interaction; the graphical user interface, when rendered, presenting:
one or more graphical objects;

a pointer object configured to be movable over one or more graphical objects, and configured to invoke a menu list containing one or more user selectable options as the pointer object is clicked or tapped over one or more of the graphical objects, wherein:

on selecting a user selectable option from the menu list, and performing one of a dragging of the pointer object and swiping a touch sensitive object over the graphical user interface, through one or more graphical objects, or through a portion of a specific graphical object, the software product is configured keep an effect corresponding to the selected option to be continuously applied to the one or more graphical objects, or to the portion of the specific graphical object, respectively, thereby enabling a change in status of the one or more graphical objects, or the portion of the specific graphical object, respectively.

Optionally, the electronic device further comprises a user input interface rendered over the graphical user interface, the user input interface being configured to obtain and interpret a user's input corresponding to moving the pointer object, clicking or tapping the pointer object, or swiping the touch sensitive object over the graphical user interface.

Optionally, in the electronic device, the graphical user interface is configured to apply continuously the user selectable option to the portion of the specific graphical object, or to one or one graphical objects, in response to a user's swiping the touch sensitive object over the portion of the specific graphical object, or to the one or one graphical objects, respectively.

Optionally, in the electronic device, the graphical user interface is configured to facilitate termination of the effect corresponding to the selected option, and facilitate disappearing of the selected option, on termination of the dragging of the pointer object or the swiping of the touch sensitive object.

Optionally, in the electronic device, the rapidity of application of the effect corresponding to the selected option, over the portion of the graphical object, or over the one or graphical objects, is dependent at least partially on the speed of performing the dragging operation of the pointer, or the swiping operation of the display sensitive object. More optionally, in the electronic device, the graphical user interface is a touch-sensitive screen, and the user interface is implemented as a tactile surface of the touch-sensitive screen.

Optionally, in the electronic device, the graphical user interface is configured to disable the application of the effect corresponding to the selected option, to the portion of the specific graphical object, or to the one or more graphical objects, in response to termination of the dragging of the pointer object, or the swiping of the display sensitive object.

Optionally, in the electronic device, the graphical user interface and the software product correspond to a gaming system or a simulation system. More optionally, in the electronic device, the gaming system or simulation system corresponds to a farming game, the graphical objects of the graphical user interface correspond to different spatial regions of a farming environment in which one or more crops are desired to be grown, and wherein the user selectable options in the menu list correspond to different farming tools.

Optionally in the electronic device, there is included a database for continuously recording and updating the change in status of the one or more graphical objects, the software product being coupled to the database and being configured to resume the status of the one or more graphical objects to their last updated status in the database, in case of interruptions in the operable state of the graphical user interface.

Optionally, a plurality of electronic devices are connected to a server through a network, the graphical user interface being generated temporally concurrently on each of the electronic devices, to facilitate a plurality of users' interaction with the graphical user interface, wherein the graphical user interfaces generated on the plurality of electronic devices are coordinated through the server and updated concurrently on the plurality of electronic devices with time.

Optionally, the electronic device is implemented using a desktop computer, a laptop computer, an iPad, or a smart phone, including an iPhone®, an Android® phone or a Symbian® phone; "e" denotes registered trademarks.

According to a fifth aspect of the disclosed embodiments, there is provided a method of facilitating easy user interactions with a graphical user interface, the graphical interface being generated and rendered on the display of an electronic device, by executing a software product on a computing hardware of the electronic device, the method comprising:

(a) rendering one or graphical objects within the graphical user interface;

(b) clicking or tapping one or more graphical objects through a pointer object, to invoke a menu list containing a set of user-selectable options, the user-selectable options corresponding to an effect to be applied to a portion of a specific graphical object, or to one or more graphical objects; and (c) selecting a specific user-selectable option, and applying the effect corresponding to the selected option, to a portion of a specific graphical object, or to one or more graphical object, by performing one of a dragging operation of the pointer object and a swiping operation of a display sensitive item, over the specific portion of the graphical object, or over the one or more graphical objects, respectively.

Optionally, in the method, the graphical user interface is configured to keep the effect corresponding to the selected user-selectable option active, until the time the dragging operation or the swiping operation is performed, and is configured to enable disappearing of the selected option when the dragging or the swiping operation is terminated.

Optionally, in the method, the software product corresponds to a gaming system or a simulation system. More optionally, in the method, the gaming or simulation system corresponds to a farming game or farming simulation, the graphical objects correspond the spatial regions of a farming environment, and the user selectable options correspond to different farming tools.

Optionally, the method further comprises continuously recording and updating the change in status of the one or more graphical objects, coupling the software product to the database, and resuming the status of one or more graphical objects to their last updated status in the database, in case of interruptions in the operations of the graphical user interface.

Optionally, the method further comprises:

(d) connecting a plurality of the electronic devices to a server through a network;

(e) generating the graphical user interface temporally concurrently on the displays of the different electronic devices; and (f) coordinating the plurality of graphical user interfaces through the server, and updating them concurrently with time, to facilitate multiple users' interaction and coordination with the graphical user interfaces.

Optionally, in the method, the graphical user interfaces correspond to a gaming system, and the method being configured to facilitate online multiplayer gaming system.

According to a sixth aspect of the disclosed embodiments, there is provided a software product recorded on a machine readable data storage medium, the software product being executable on the computing hardware of a computing device, for implementing a method pursuant to the fifth aspect of the invention.

It will be appreciated that features of the disclosed embodiments are susceptible to being combined in various combinations without departing from the scope of the invention as defined by the appended claims.

BRIEF DESCRIPTION OF THE DRAWINGS

The aspects of the disclosed embodiments will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSED EMBODIMENTS

Figure 1:
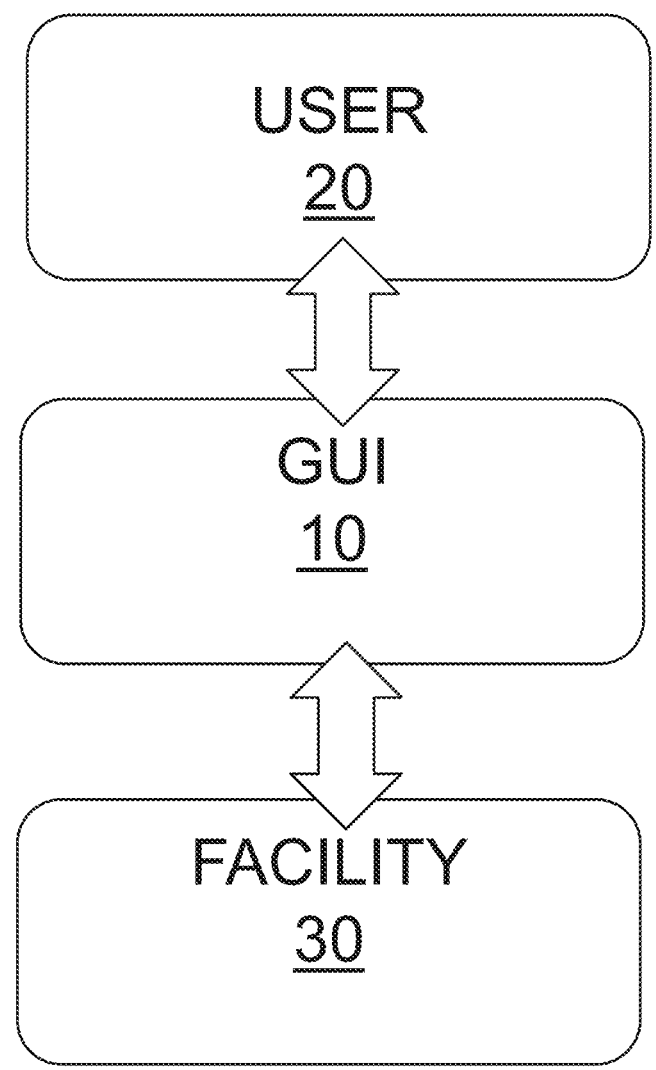
FIG. 1 is an overview schematic illustration of a system pursuant to the aspects of the disclosed embodiments, providing a graphical user interface (GUI) for interfacing one or more users to a facility, wherein the facility includes elements of gaming, simulation and/or real technical system control.

In overview, the aspects of the disclosed embodiments are concerned with an apparatus for controlling technical processes, wherein the technical processes include elements of simulation and control of facilities. In FIG. 1, there is shown an apparatus 10 for providing a graphical user interface (GUI) between a given user 20, for example one or more persons, and a technical facility 30, wherein the apparatus 10 is conveniently implemented using a device including computing hardware which is operable to execute one or more software products recorded on machine-readable data storage media. Moreover, the apparatus 10 is conveniently implemented using contemporary computing platforms, for example computing platforms which are wireless-enabled for supporting communication via wireless communication networks. The technical facility 30 optionally includes elements of simulation, gaming and real system control.

An embodiment pertains to a graphical user interface for a gaming and/or simulation system, for facilitating easy and quick interaction of a given user while playing a game or controlling a simulation, and for avoiding contemporary problems experienced while performing touching or swiping operations on the touch-sensitive screens of electronic devices on which the games are being played and/or simulations are being executed.

Gaming systems are incorporated for leisure in many electronic computing devices, including computers, iPads, mobile phones, tablet computers and smart phones. Many such conventional electronic devices incorporate touch-sensitive screens for obtaining user inputs and for making congenial user experience with the interface. For playing games on electronic devices, or controlling technical simulations, without a touch-sensitive screen, including many desktop and laptop computers, the user generally interacts with and provides inputs to a gaming or simulation system's interface through coupled input devices, such as mice, certain keys on the keypads, and joysticks. Using multiple clicking operations through a mouse is time consuming and unfavourable, for example, in cases where a same operation needs to be performed at multiple points on the gaming or simulation interface. Even with the devices have touch-sensitive displays, when similar operations corresponding to the game being played, or the simulation being executed, need to be performed simultaneously through multiple regions of the interface, this becomes difficult to achieve as the conventional touch-sensitive screens are capable of sensing touching operations one at a time, at a specific point. Even though multi-touch sensitive screens are currently available, and are incorporated in electronic devices, operations corresponding to certain games, when played, similarly corresponding to certain technical simulations, require simultaneous sensing and detecting of touching or swiping operations performed through multiple regions of the screen.

Thus, the present disclosure provides an enhanced graphical user interface for a gaming and/or simulation system, which improves a given user's experience while playing a game, or executing a technical simulation, on an electronic device. The system and method facilitate performing of touching and swiping operations through a multi-touch sensitive screen of the electronic device, and allows the given user to perform similar operations pertaining to the game or simulation, simultaneously, through different regions of the interface.

Figure 2:
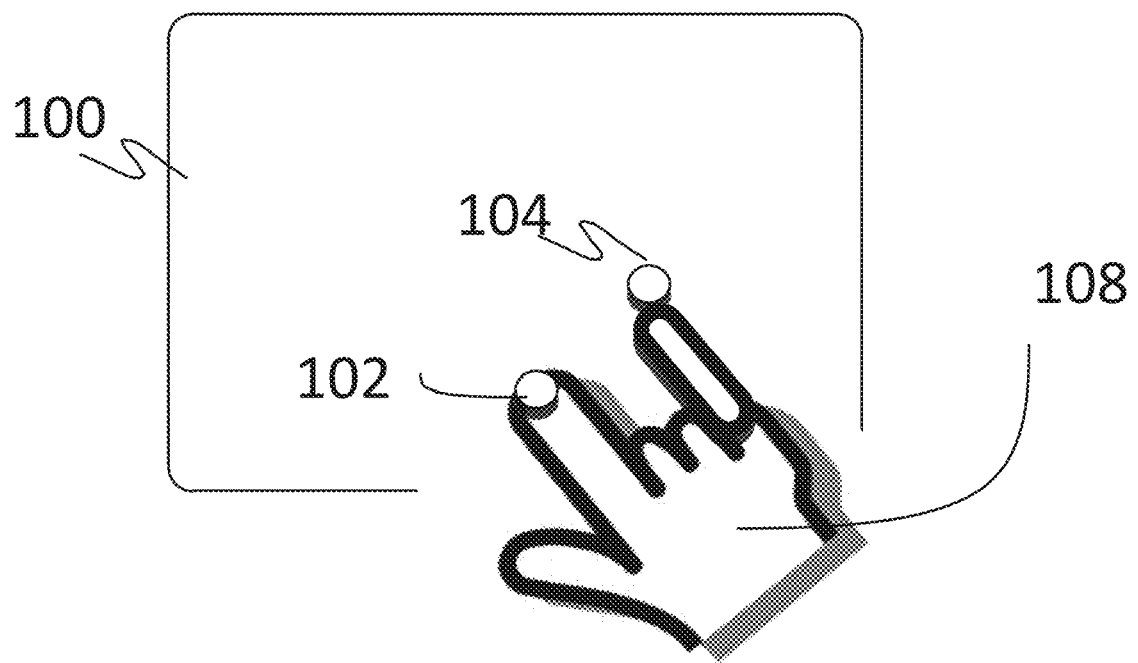
FIG. 2 is an illustration of an embodiment of the graphical user interface of FIG. 1.

In FIG. 2, there is shown a graphical user interface corresponding to a game being played, or a simulation being executed, on an electronic device, illustrating a manner in which a user playing a strategic game or executing a simulation performs touching or swiping operations through multiple points of the interface, simultaneously, for executing similar operations through multiple locations on the interface. As shown, a graphical user interface 100, corresponding to the game being played or a simulation being executed, is rendered on a display screen on the electronic device. Specifically, the interface 100 is rendered and presented on the display screen, when a software product corresponding to the game or simulation, is executed on computing hardware of the electronic device. The display screen is a multi-touch sensitive screen, capable of sensing touching or swiping operations performed at multiple points on the screen simultaneously. A user 108 uses two of his/her fingers and performs touching operations at two different locations 102 and 104, on the interface 100. The interface 100 senses this operation, and the software product corresponding to the game or simulation, executes actions pertaining to the performed touching operation on different graphical objects of the interface 100. This is explained in more detail hereinafter with respect to an example of a specific gaming environment or simulation environment, in conjunction with the drawings that follow.

Figure 3:
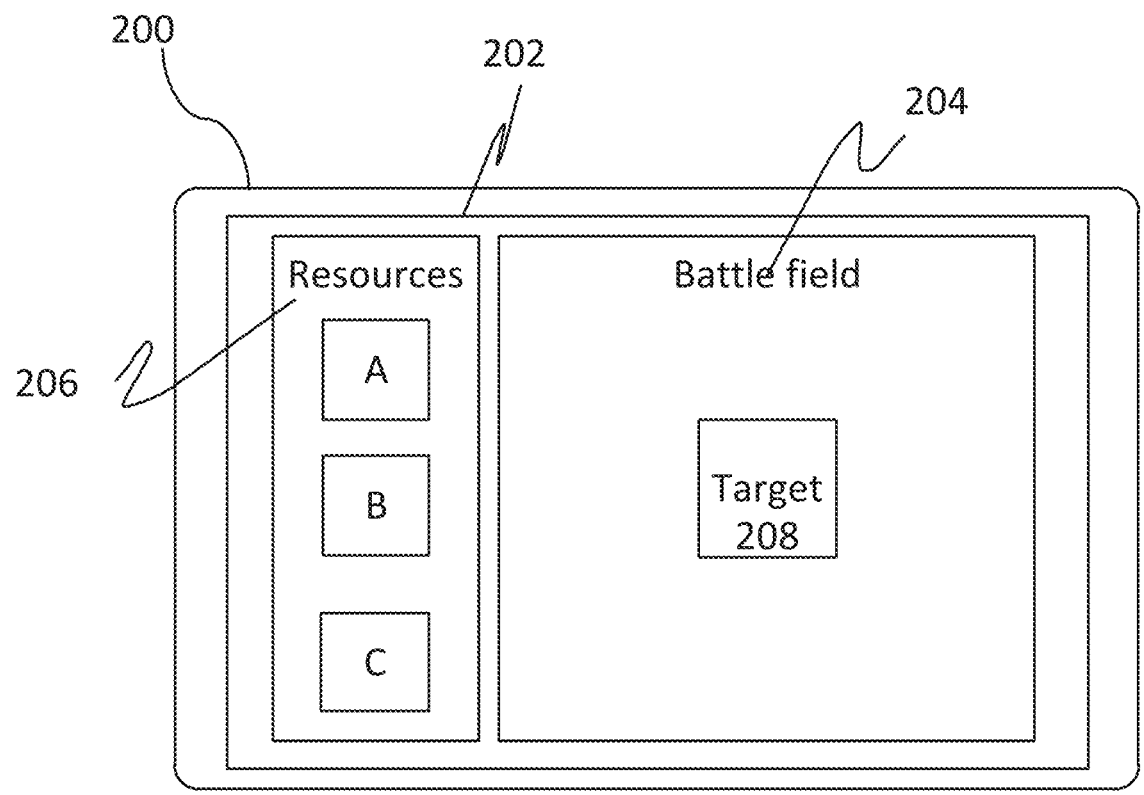
FIG. 3 is an illustration of an example environment which is controllable using the graphical user interface of FIG. 2.

In FIG. 3, there is shows a snapshot of the display screen of an electronic device, when a user plays a game, or executes a simulation, on the device, and uses the method of the present disclosure for controlling the gaming- or simulation-interface. As shown, an electronic device 200 includes a display screen 202, wherein different resources, for performing actions corresponding to the game or simulation, are rendered on a graphical element 206 of the display screen 202. For the purpose of explaining the disclosure, the depicted gaming- or simulation-environment corresponds to a war-based game or simulation, and the gaming environment rendered on the display screen 200 corresponds to a battlefield 204. The device 200 can be any suitable electronic device that incorporates a multi-touch sensitive screen, including an iPad, a smartphone, for example, Apple's iPhone®, an Android Phone®, or a Symbian Phone®, a tablet computer, a desktop computer or a laptop computer, and so forth. The battlefield 204 has different graphical objects, for example, a target 208, which can represent a castle, or a camp. An objective of the game or simulation may be to win the castle, by attacking it through different resources A, B and C, and so forth, shown within the graphical element 206. The resources A, B and C within the element 206 can represent weapons, including guns, cannons, arrows, bows, and so forth (namely technical hardware), or represent different troops, armed soldiers, walking soldiers or horse riding soldiers, and so forth. Though only three such resources have been shown, there can be multiple other resources for playing the game or executing the simulation. In the strategic game or simulation, the user selects one or more of these resources, and deploys the selected resources at multiple locations within the battlefield 204. The selected resources are then used to perform operations for conquering the target 208. For example, the deployed resources can be operated to attack the target 208 through the different weapons they possess. The user can use multiple touching operations simultaneously, at different points on the display 202, to deploy the resources A, B, C, and so forth at multiple locations within the battlefield 204. Moreover, the user can also perform the swiping operation, to deploy a specific resource all through a set of points along a specific path, by swiping fingers across that path. The movement of the different deployed resource, either away from, or towards the target 208, can be controlled by pointing towards a specific deployed resource, and swiping the finger in the desired direction. When the user touches the display screen 202 to deploy a selected resource, the screen 202 detects the pressure applied by the user at different points. The number of resources deployed at different locations optionally depends on the amount of pressure applied. Specifically, a higher pressure applied at a specific point results in deploying increased numbers of resources at that point, and vice versa. Moreover, the rapidity of deploying the resources at different locations on the battlefield 204 depends upon the speed with which the user performs the touching or the swiping operation through different points. For example, if the user wishes to deploy a selected resource along different points in a specific path, and performs a swiping operation through the path, the resources are deployed as quickly as the swiping operation through the path is performed. A rapid swiping operation results in a quicker deployment of resources, compared to a slow swiping operation.

Moreover, in FIG. 3, there is shown the display screen of the device, when the user has selected one of the selectable options A, B and C, for deploying resources within the battlefield of the war-based game or simulation. Shown as an example, the user has selected the option B corresponding to a specific category or type of resources to be deployed in the battlefield, to operate on the target 208 thereafter. As aforementioned, the selected resources may be troops, armed soldiers possessing specific kinds of weapons, horse riding soldiers, and so forth. Further, though only one option has been shown being selected, the user can also select multiple options to deploy different kinds of resources in the battlefield. Eventually, after selecting the option B, the user uses two of his/her fingers to control the interface and deploy the troops at two desired points 302 and 304, as shown. Specifically, the user performs a touching operation at the points 302 and 304, either simultaneously, or in temporal sequence, namely one-by-one. Alternatively, a swiping operation may also be performed by initiating from either of the selected points 302 and 304, through a specific desired path, to deploy the resources all through the desired path. In an embodiment, the resources are deployed at the selected points, at a specific pre-determined time after the touching operation is performed. For example, in one embodiment, the resources may be deployed at a specific point only if the user keeps his finger in touch with the point for a pre-determined time, which may be about 0.5 to 1 seconds. This feature is adjustable, and the minimum time for which the user needs to keep his fingers in contact with the screen, for deploying the resources, can be customized based on the user's desire, before playing the game or executing the simulation. Further, this avoids the cases where the resources may be deployed unintentionally or undesirably.

A specific deployed resource is released for action, for example, to attack the target 208, based on detection of certain conditions. This may include, for example, the user still keeping his/her finger at a desired point, for about 1 to 2 seconds after the resource has been already deployed at that point. In another case, an execution option may be separately rendered on the display screen, and the user needs to provide an execution command through the option, after the resources are deployed. Moreover, the multi-touch operations performed through the different fingers act independently, and the display screen is configured to sense and interpret the swiping or touching operations performed through these fingers independently. Specifically, as an example, when one finger is touched or swiped through specific points on the screen, one set of resources may be deployed over one set of locations corresponding to those points, and subsequently, when another finger is touched or swiped through a different set of points, a second set of resources may be subsequently deployed over those points too. The two sets of resources may be same or different, depending on the game settings, which are user adjustable, and can be customized before playing the game or executing the simulation Furthermore, as aforementioned, the display screen is also capable of sensing touching or swiping operations performed at different points simultaneously, and deploy the resources at different points together. In an embodiment, the number of resources deployed at different points, may be one each corresponding to detecting of a touching operation performed at that point. Alternatively, a constant number of resources per unit time may be deployed at a specific point, or over a set of points, as long as a touching or a swiping operation is performed over those points. In another embodiment, as aforementioned, the number of resources deployed is a function of the pressure applied by the user while performing the touching or swiping operation. Specifically, a higher pressure applied at a specific point optionally results in deploying more number of resources at that point, and vice versa.

Figure 4:
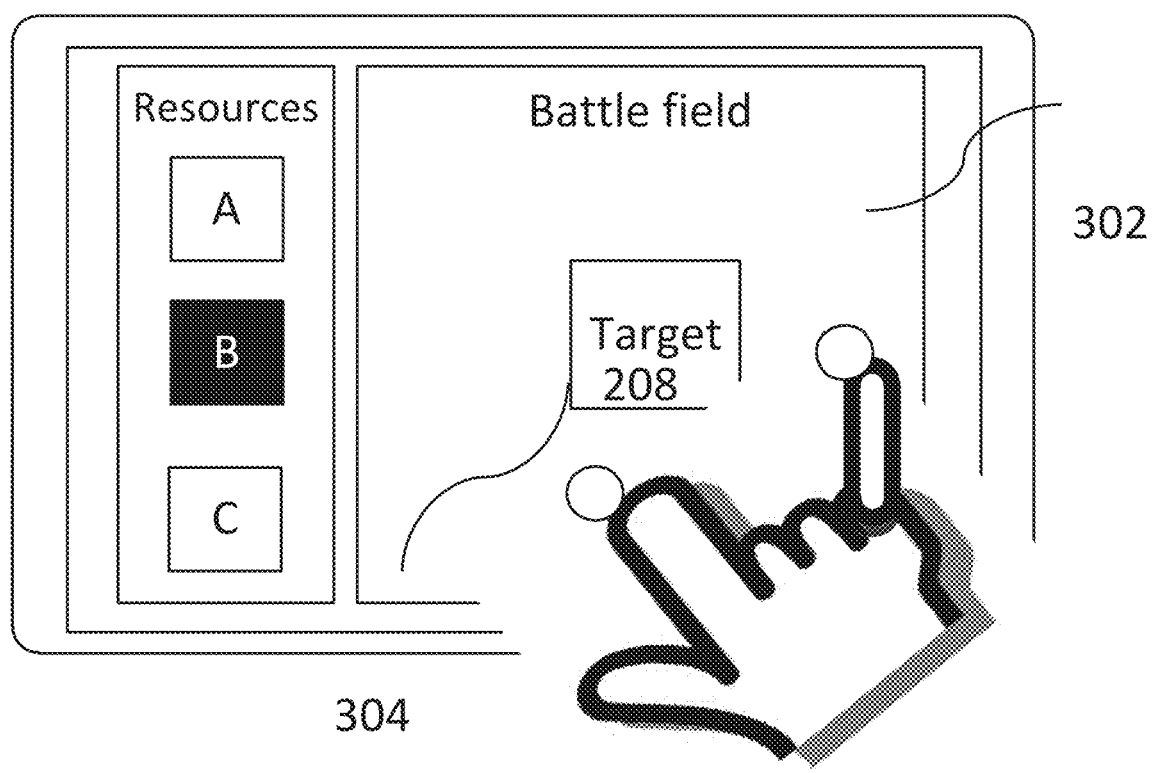
FIG. 4 and FIG. 5 are illustrations of user interactions with the environment of FIG. 3.
Figure 5:
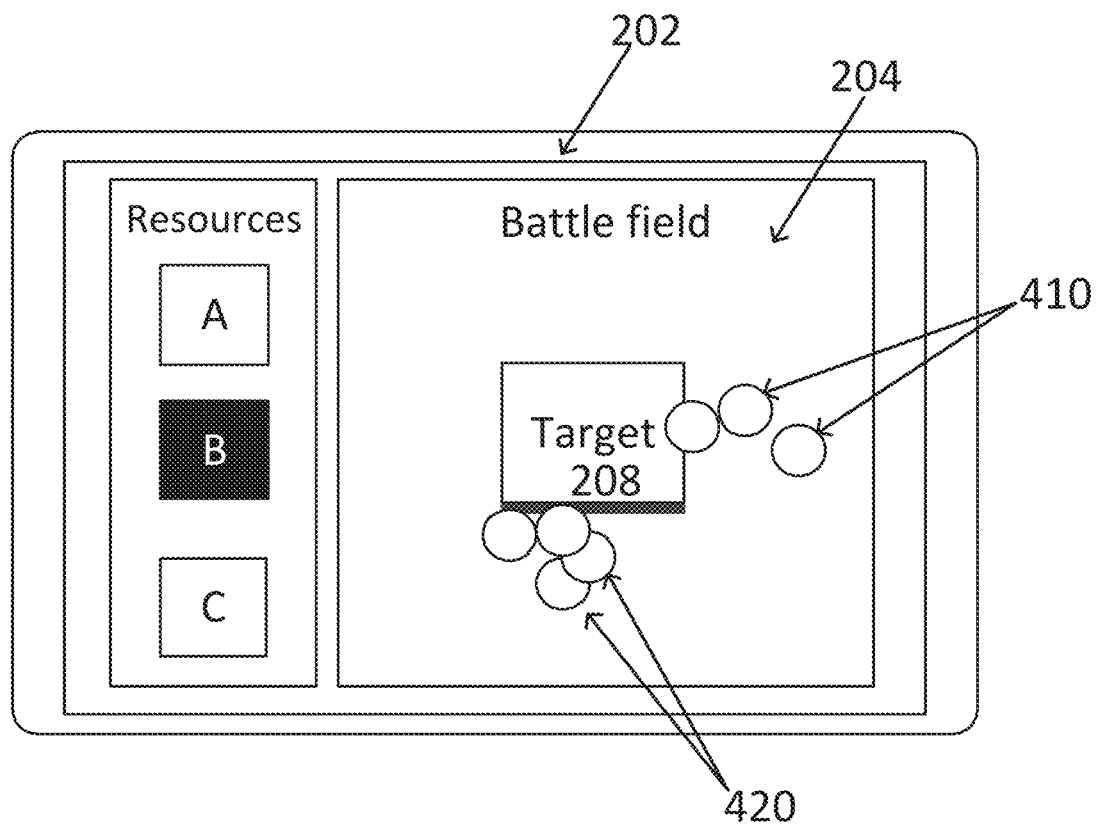

Referring next to FIG. 4, there is illustrated the display screen of the electronic device, where the resources corresponding to the selected option B, are shown deployed at multiple locations on the display screen. As shown, a set of resources 410 are deployed at one set of locations on the screen 202, and these correspond to multiple touching operations performed earlier around a point 302, shown in FIG. 4. To deploy the resources 410, the user optionally performs a swiping operation through a path covering these points. Moreover, another set of resources 420 are shown deployed on the other side of the target 208. These resources are rendered when the touching operations initiating with a point 304, see FIG. 4, is performed by the user, through another finger. Similarly, a touching or swiping operation is optionally performed at many other points on the display screen 202, to deploy the resources at other desirable points.

Figure 6:
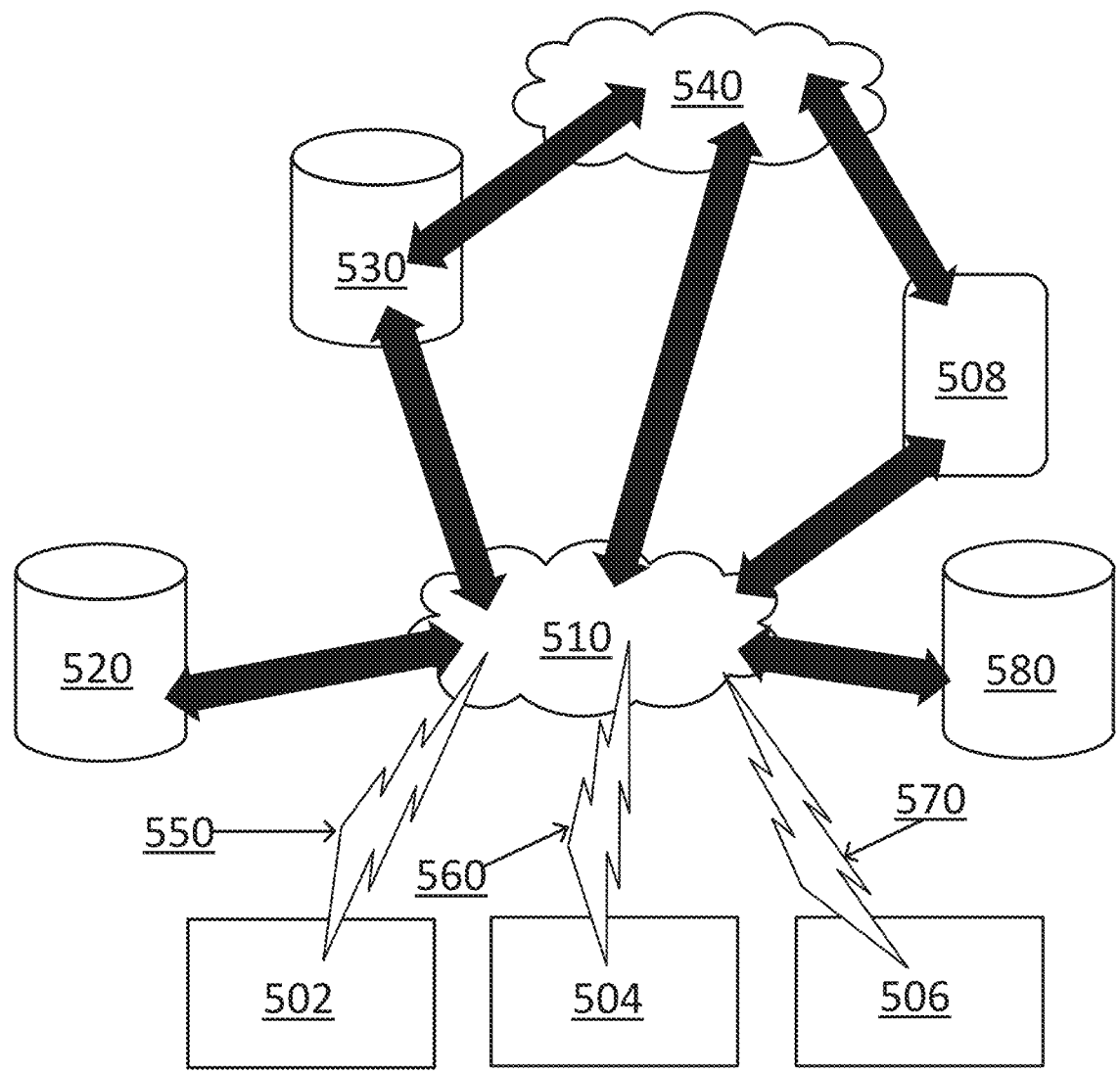
FIG. 6 is an illustration of a network of servers and devices required for implementing the system of FIG. 1.

In FIG. 6, there is shown an illustration of an exemplary environment for implementing the method and apparatus in accordance with the present disclosure. A plurality of electronic devices 502, 504, 506 and 508 are shown, through which a user can connect to one of different data servers 510 and 540, for example game servers and/or simulation servers, through one of a multiple networks represented by 550, 560 and 570. The electronic devices 502, 504, 506 or 508, can be any suitable electronic devices having a computing hardware capable of supporting and executing a software product corresponding to a gaming and/or a simulation system. Typical examples of the illustrated electronic devices may include a desktop computer, a laptop computer, a tablet computer, a smart phone including the popularly known iPhones®, Android Phone®, an iPad, and so forth. Furthermore, all these electronic devices have one or more multi-touch sensitive screens for sensing and obtaining a user's input through touching or swiping operations performed at multiple points of the one or more display screens. Moreover, the different electronic devices 502, 504, 506 and 508, are mutually connected to each other through either of the servers 510 and 540, through suitable communication networks. The networks 550, 560 and 570, and so forth, may be Wireless networks, such as a Wireless Local area network (WLAN), Local area networks (LAN), cellular networks, for example, 2G network, 3G network, and so forth. Moreover, any of the electronic devices 504, 506 and 508 may also use its own Bluetooth network and may be capable of connecting to a Bluetooth server, to synchronize with the other electronic devices; "Bluetooth" is a registered trademark. The shown exemplary environment supports multiplayer gaming too, by facilitating multiple users to be online through different devices, connecting through a suitable network, and synchronizing with each other. Moreover, multiple databases, as shown by modules 520, 530, and so forth, are coupled to different servers, and information related to the gaming environment is continuously stored in these databases, when the different users are online for multiplayer gaming.

For facilitating single-player gaming or single-user simulation, a user logs on through any of the electronic devices 502, 504, 506 or 508, and connects to one of the gaming or simulation servers 510 or 540, through a suitable network, for example via the Internet and/or a wireless communication network. As the user logs on, and executes the gaming or simulation software on the computing hardware of the specific device that he/she utilizes, for example, the device 502, a graphical user interface corresponding to the game is generated, and is rendered on the display screen of the device 502. The graphical user interface presents different graphical objects pertaining to the game or simulation, on the display screen of the device 502. The graphical objects may be represented by different blocks/segments of the graphical user interface, on which different operations corresponding to the game being played or simulation being executed, can be performed. For example, in a case where the game is a war-based game or the simulation relates to technical military hardware such as guns, bombs and such like, such blocks/segments may represent one or more targets that need to be conquered, such as the target 208 shown earlier in FIG. 3. Moreover, one or more graphical elements, representing a set of user selectable options for performing actions on the graphical objects, are also rendered on the interface of the device 502. Such elements have been explained in detail earlier, in conjunction with the previous drawings of the disclosure, which pertain to a war-based game or simulation. Moreover, a point object (cursor) movable over the different graphical objects appears on the graphical user interface, for controlling the gaming or simulation operations. The pointer object is controllable by performing touching, swiping or tapping operations on the display screen of the device 502. Moreover, other input devices, including a mouse, a joystick or a set of keyboard buttons, may be coupled to the device 502 (though not shown), for facilitating provision of user inputs. The touching operation on the display screen can be performed through use of a suitable touch-sensitive object, including fingers, a pen, a pencil, a pointing organ, and so forth.

Another database 580, coupled to the gaming or simulation server 510, serves as a back-end database for the gaming or simulation server 510. As the user of the device 502 starts playing the game, or executing a simulation, typical actions and gestures performed by the user, are recorded in the back-end server 580. Specifically, such actions are interpreted through the gaming or simulation server 510, and are sent as messages to the back-end server 580, which eventually maintains a log of, and a backup for the played game or executed simulation. Such messages can be in the form of data packages sent over an Internet connection through which the device 502 is connected to the server 510, or sent over any other wireless or wired network connecting the device 502 to the server 510, as aforementioned. Typical elements of such messages for maintaining a backup for the game or simulation may include a header, a payload and a checksum. The checksum can be a function of the payload, or it may be a unique user identifier, such as a username or similar. An advantage arising from including the checksum in the back-end maintaining messages, is a possibility of avoiding potential frauds while playing the game, or avoiding third-party corruption of a simulation which could adversely influence results generated by the simulation. Those in the art will understand that an appropriate checksum function or a checksum algorithm may be applied to the collected digital data, while the game is being played, or simulation being executed, to obtain the checksum. Further, the checksum corresponding to a specific data can be recomputed at any point of time, and compared to the stored checksum, to avoid possible frauds. The back-end messages received by the server 510 are also sent to the other databases 520 and 530 of the server 510. In these databases 520, 530, these back-end messages are used to maintain a continuous logic that represents the status of the game or simulation, for example, the exact score of the player updated with time, and a stage of the game that the player has already reached, or results of the simulation such as yield, integrity of a structure and similar. With a continuous receipt of the back-end messages by the databases 520 and 530, a regular updating of the game status is undertaken within these server databases 520 and 530, eventually, with time. This ensures facilitating the resumption of the game or simulation to its last status, in cases where the device 510 unexpectedly shuts down, the device 510 is unexpectedly hindered in its communication or the user changes the gaming or simulation terminal, or he/she intentionally quits playing or executing the simulation for a certain period, and logs in at some other time, such a possibility of resumption assists to enhance user satisfaction with the graphical user interface.

Though only two servers 510 and 540 have been shown, there can be multiple gaming or simulation servers coordinating with, and connected to each other, for implementing the gaming and/or simulation environment in accordance with the present disclosure. Moreover, the environment as shown in FIG. 6 is capable of implementing a thin client game or simulation, namely written in a computer program that is partially independent in its computational roles, wherein a part of the gaming- or simulation-logic may be stored in any of the servers 510 and 540, and a part of it may be stored in the gaming or simulation terminal. The depicted environment also supports a thick client game or simulation, namely written in a solely independent computer, wherein the entire gaming or simulation logic may be stored in the gaming terminal. Furthermore, the game or simulation is optionally completely web-based too, wherein most of the gaming or simulation logic may be stored in any of the servers 510 or 540. The gaming or simulation software corresponding to the game or simulation being played or executed respectively, can be optionally written in any programming language.

Although, the gaming or simulation system implementable through the illustrated gaming or simulation environment, has been described for the case when a single user logs on to any of the electronic devices 502, 504, 506 or 508, the same gaming or simulation environment is capable of supporting multi-participant gaming or simulation, wherein different users may log on through different electronic devices, and synchronize with each other by connecting concurrently through any of the common gaming or simulation servers 510 and 540, through suitable networks as aforementioned, and share a common graphical user interface representing the ongoing game or simulation. In such embodiments, the graphical user interface rendered on the display screens of the different electronic devices, is regularly updated, concurrently, through the logic data stored in the databases 520 and 530 of the gaming or simulation servers, at the back-end.

Figure 7:
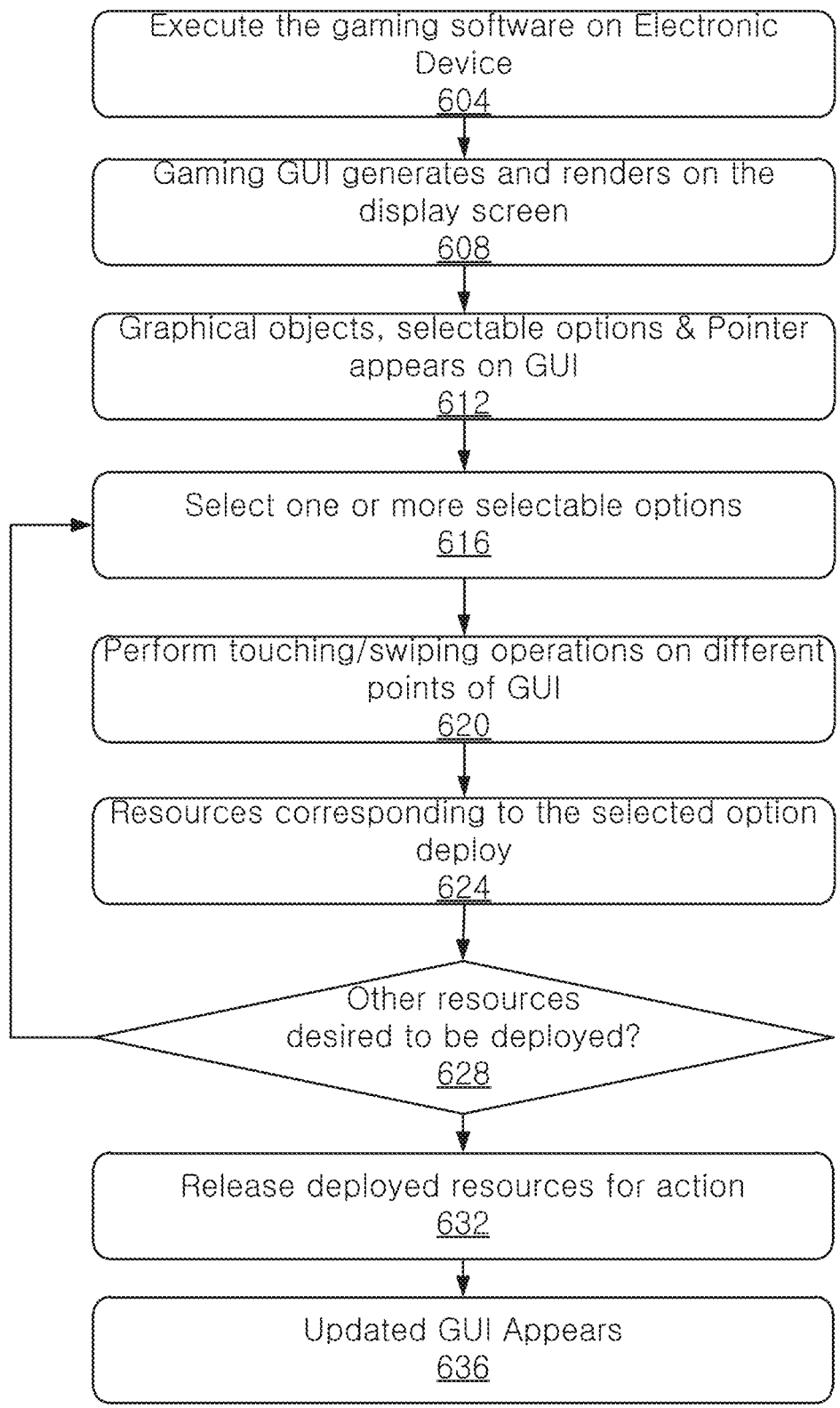
FIG. 7 is a flow diagram of steps implemented within the system of FIG. 1.

In FIG. 7, there is shown a method of facilitating user interactions with a graphical user interface (GUI), while playing a game or executing a simulation. The method is elucidated in conjunction with a typical example of a war-based game or simulation, described earlier through the previous figures of the disclosure. However, the method can be generalized and implemented on other gaming or simulation environments also, and is not intended to limiting the scope of the present disclosure. At a step 604, the method includes a step of executing a software product on computing hardware of an electronic device. The electronic device can be any appropriate device incorporating a multi-touch sensitive screen, examples of which have been set forth earlier. The software product corresponds to a gaming or simulation system, for facilitating playing of a game or executing a technical simulation on the electronic device. At a step 608, as the software product is executed, the method includes generating and rendering on a graphical user interface a representation of the gaming or simulation environment on the display screen of the electronic device. At a step 612, the method includes presenting via the graphical user interface different graphical objects, a set of user selectable options for controlling the gaming or simulation environment, and a pointer for performing touching or swiping operations through different points on the interface. For example, as aforementioned, in a war-based game or simulation, the graphical objects may correspond to a castle to be conquered, a camp to be destroyed, and so forth, and the gaming or simulation environment may represent a battlefield. The user selectable options may correspond to different resources that can be deployed over different portions of the interface, to perform operations on the graphical objects, for example for scoring points or otherwise determining their technical characteristics. Specifically, the resources may be different kinds of troops, horse riding soldiers, armed soldiers possessing versatility of weapons, including guns, bombs, cannons, bows, arrows, and so forth. At a step 616, the method includes the user selecting one or more selectable options corresponding to the different kinds of resources that he/she wants to deploy within the gaming or simulation environment. Proceeding further, after selecting and enabling one of the selectable options, at a step 620, the method includes deploying the corresponding resources, the user performs touching or swiping operations on multiple points of the interface, depending on the locations where he/she wishes to deploy them. At step a 624, the resources are deployed and appear on the gaming or simulation interface. In an embodiment, the nature of deployment of the different resources may depend on different parameters. For example, the number of resources deployed at a specific point, depends on the pressure applied by the user on the display screen, while performing the touching operation at that point. Moreover, if the user wishes to deploy resources along multiple points constituting a specific path, and performs a swiping operation along that path, the rapidity with which the resources are deployed depends on the speed with which the user performs the swiping operation along the path. In another embodiment, a constant number of resources per unit time can be deployed at each point where a touching operation is being performed. The nature of deployment of resources is user adjustable, and can be customized, based on the user's priority, before playing the game.

At a step 628, the method includes checking whether or not other resources are desired to be deployed, before executing actions through the resources. If "yes", the method includes returning to the step 616, selecting the selectable options corresponding to the resource, and performing the touching or swiping operations through the desired points again. Alternatively, going further, at a step 632, the method includes releasing the deployed resources for action, within the gaming or simulation environment. For example, in a war-based game or simulation, the deployed troops/armed soldiers are released for operating on a specific target, to attack it from different points where they are deployed. In an embodiment, the releasing of the deployed resources is automated, and occurs when the user keeps his/her fingers on a specific resource for a pre-determined time after deploying it. For example, this time may be about 1 to 2 seconds of touching operation after the resource is already deployed. The display screen is configured to sense this pre-determined time, and the software product executes action pertaining to the deployed resource, when this occurs. In another embodiment, releasing the different resources may require a manual user input. Specifically, for example, a triggering option (like a "go" or "fire" option) may be rendered after deploying the resources, and the resources may not be released until the user manually initiates the option. At a step 636, after the actions have been performed by the deployed resources, the graphical user interface is updated and a reformed interface representing the latest status of the gaming- or simulation-environment, renders on the display screen.

The method and system of the present disclosure, for improving interaction of a user with a graphical user interface corresponding to a game and/or simulation, provides substantial benefits as the user performs different operations in a gaming or simulation environment. Similar operations, when desired to be performed by a user, through different locations on the gaming or simulation interface, can be easily executed by touching or swiping through multiple points of the display screen simultaneously. Hence, the user's experience with the gaming or simulation interface is much more comfortable.

Although the present disclosure has been described comprehensively, through an exemplary embodiment where it is applicable in a gaming and/or simulation environment, and specifically through the example of a war-based game or simulation, the disclosure also finds it applications in other gaming, control and simulation environments, and, generally, may be applicable to other graphical user interfaces, not pertaining to a gaming or simulation system also. In certain applications, the user interface of the disclosed embodiment can be used for a virtual control of any type of game, technical system or simulation. Certain aspects of the disclosed embodiments are also applicable to perform other operations, including building arcades and solving puzzle games. Further, the congenial user interface may also be implemented within other types of games, for example, adventurous, role playing and shooting games, construction and management simulation games, and so forth. For example, the congenial user interface can be used in computer terminals employed at financial exchanges, for example in Wall Street in New York and the Stock Exchange in London, where traders need to control multiple transactions simultaneously when executing a financial transaction, for example a synthetic credit default swap or a trading in derivative financial products.

Further embodiments of the will now be described below. The present disclosure pertains to a graphical user interface (GUI) for a gaming or simulation system, as aforementioned, for facilitating easy and quick interaction of a user while playing the game or executing the simulation, and for avoiding the cumbersome operations normally experienced while using a mouse or a joystick when a game or simulation is played or executed respectively on an electronic device.

Gaming and simulation systems are incorporated for leisure in many electronic devices, including computers, iPads, mobile phones, tablet computers and smart phones. While playing a game, or executing a simulation, on the computing devices without a touch-screen facility, including many conventionally available desktop and laptop computers, the major mode of interaction of a user with the gaming or simulation system interface is through devices like mouse, certain keys on the keypad, and the joysticks coupled to the computing device. In many games or technical simulations, the user often desires to obtain quick application of certain operations, for which he/she needs to use the clicking or tapping operation multiple times, and at different spots of the interface, which often takes time. Most of the smart phones and tablet computers have now incorporated touch screen displays, and playing games on these devices is comparatively easier. However, while interacting with the touch-sensitive screen acting as tactile surface for the graphical user interface corresponding to a game, multiple clicking or tapping operations at a single or different places may deteriorate the screen. Moreover, the screen often gets degenerated in long run, producing scratches and dirt spots on it, as a device is used too often for playing games, which is often undesirable. Furthermore, certain operations require consistent clicking and tapping at different locations on the graphical user interface, which takes time to enable the operations.

Figure 8:
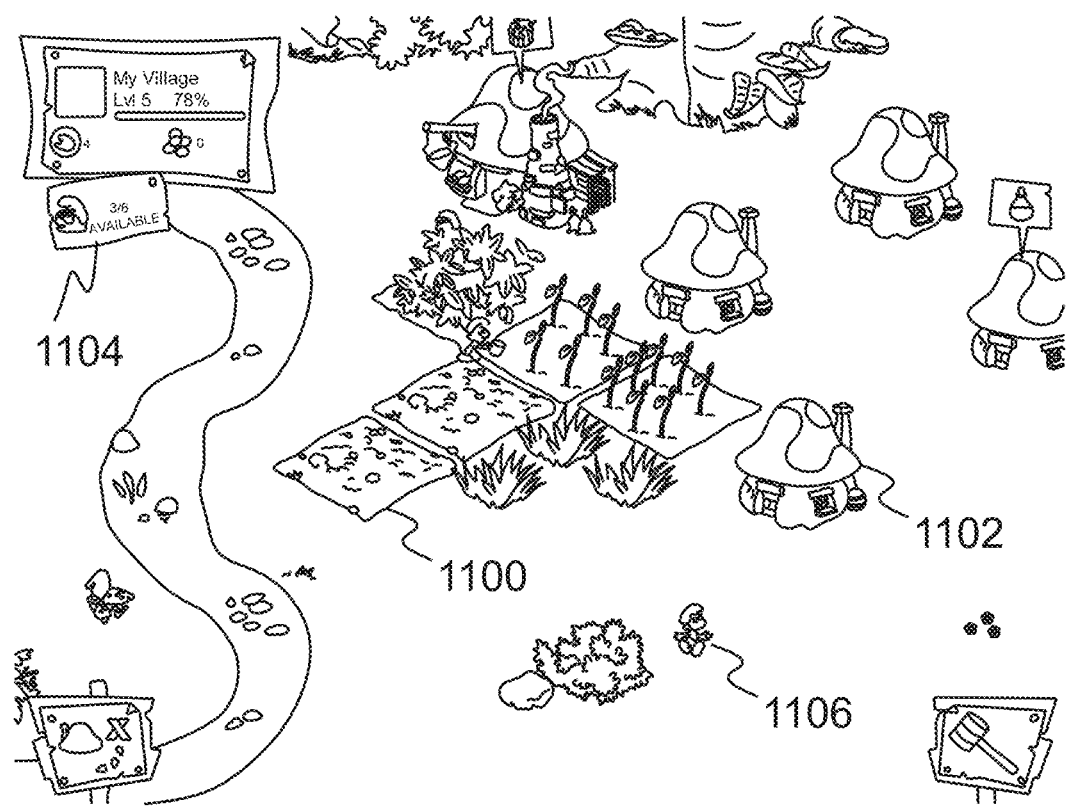
FIG. 8, FIG. 9 and FIG. 10 are illustrations of an environment which the system of FIG. 1 is operable to simulate or provide a playing environment.

In FIG. 8, there is depicted the graphical user interface corresponding to a farming game or farming simulation, illustrating how the different relevant operations are conventionally performed, and the problems faced by a user/player, while performing these operations. The simulation is beneficially employed in respect of Africa as a technical assistance for farmers coping with agriculture in harsh environmental conditions, for example exacerbated by anthropogenically-forced climate change believed to be caused by anthropogenic Carbon Dioxide emissions into the Earth's atmosphere, causing an increase of atmospheric Carbon Dioxide concentration of circa 3 p.p.m./year, in respect of a contemporary Carbon Dioxide concentration in atmosphere of around 400 p.p.m. Increased Carbon Dioxide concentrations are believed to be causing acidification of World oceans, namely adversely influencing major sources for aquatic foods, already stressed by radioactive leaks from Fukushima, Japan, namely the worst industrial accident in human history.

Figure 9:
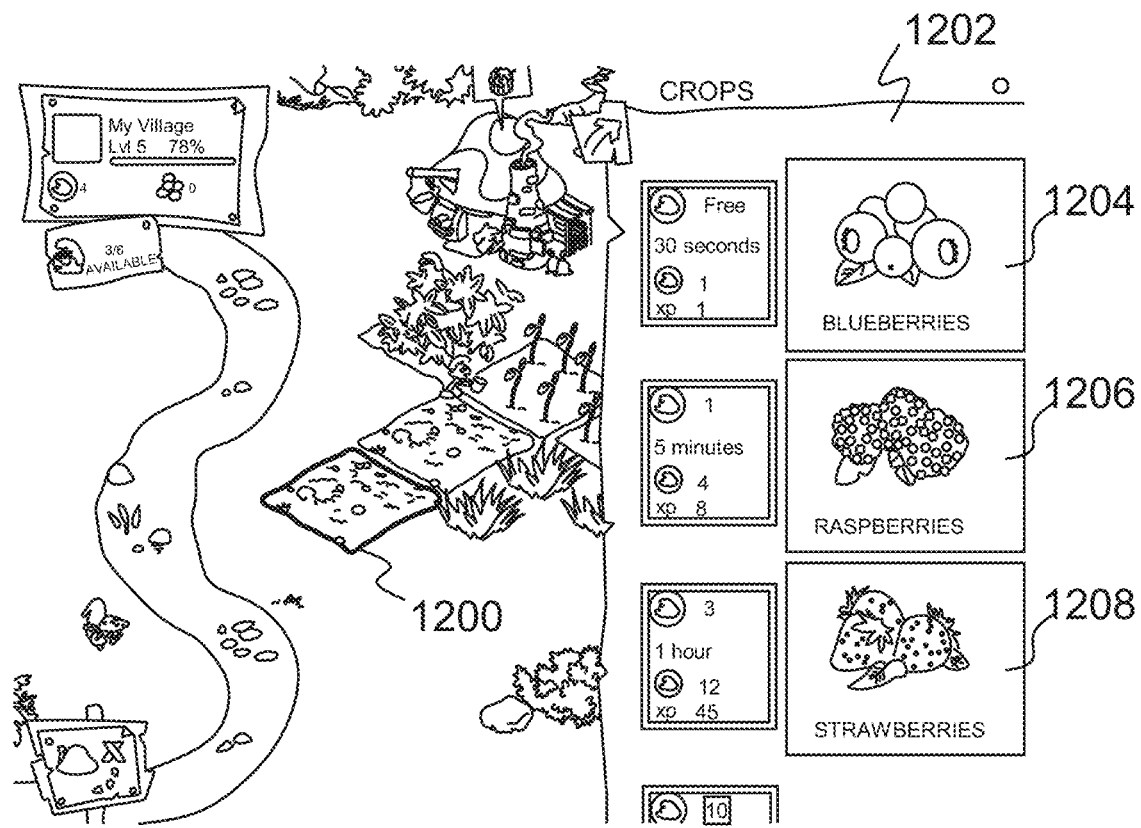

In FIG. 8, there is a farming field 1100, and multiple characters 1106 which control the operations on the field 1100. The characters 1106 are controlled by the user/player, and are moved and allowed to perform different operations within the field 1100. A score card is shown in the top left corner of the graphical interface, and different houses 1102 are shown, where the characters 1106 can hide. The game or simulation is about growing different crops/fruits in different suitable parts of the field 1100, for example as a function of future weather predictions pertaining to Africa, for example as determined from analyzing data from meteorological satellites. An example situation is now to be described: the character 1106 desires to grow something in a specific region of the field 1100. Referring next to FIG. 9, the user selects a graphical object 1200 corresponding to the location where he/she wishes to grow a specific crop. The selection is made by tapping the object 1200 through the mouse, or by touching the interface, if the interface is touch-sensitive. As the user touches the object 1200, a menu list appears, containing different selectable options corresponding to different crops that can be grown in that area, for example, raspberries 1206, blueberries 1204, strawberries 1208, and so forth, as shown. Suppose the user has decided to grow blueberries 1204 in one portion, and raspberries 1206 in another region of the field. For this the user selects the relevant options and selects the corresponding regions where he/she wishes to grow them. Continuing further, the updated field 1100 of FIG. 8 is shown now in FIG. 10, where blueberries have been shown grown in a region 1300, and the raspberries have been shown grown along the region 1302. A major problem here arises when the farming field is substantially large, and different crops are required to be grown in different regions of the farming field. Moreover, a specific crop may be desired to be grown in different regions of the field, lying proximal to each other, or in abutment. For enabling this, the user needs to select each of those regions individually, through multiple clicking/tapping operations through the mouse, or by pointing the finger or a touch sensitive object like fingers, on different regions, in case where the screen is a touch-sensitive screen. In both the cases, the operation consumes a lot of time, and specifically, when the operation is performed on a touch-screen through fingers, it may deteriorate the screen eventually.

Figure 10:
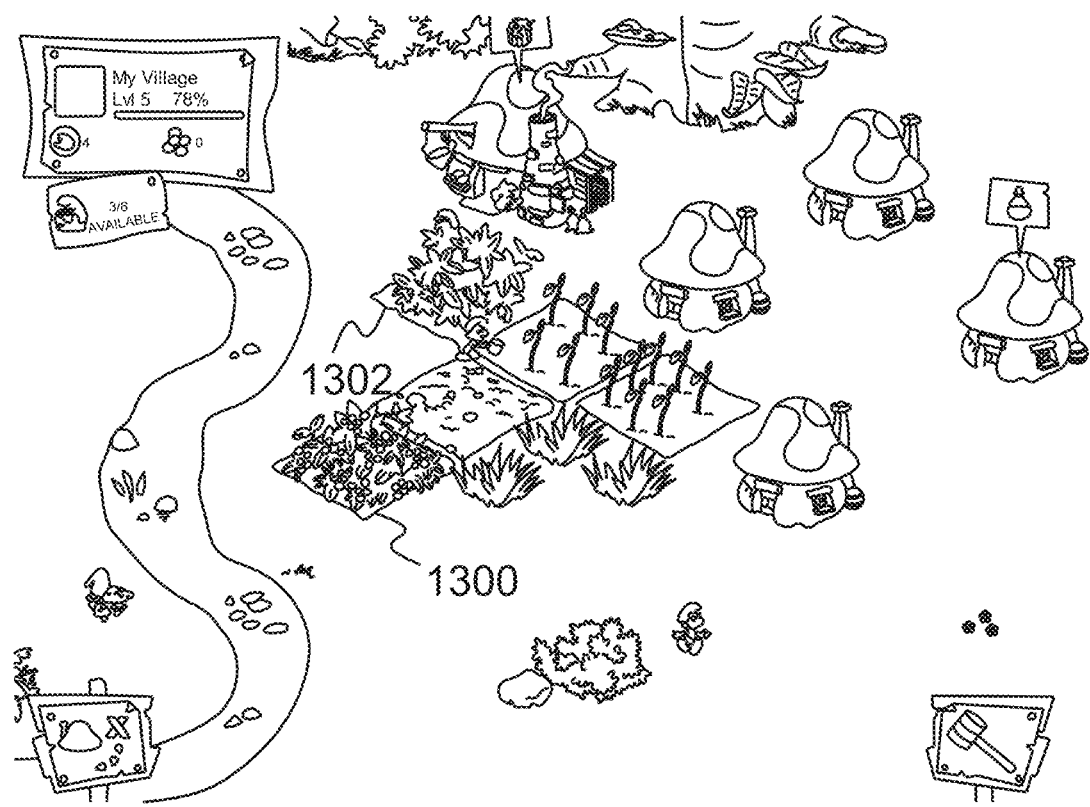

The present disclosure provides an efficient and user friendly graphical user interface (GUI) for a gaming- or simulation-system like that shown in FIG. 8 to FIG. 10, an interface that facilitates easy and quick operations by dragging a pointer object or by performing a swiping action over different graphical objects of the interface.

Figure 11:
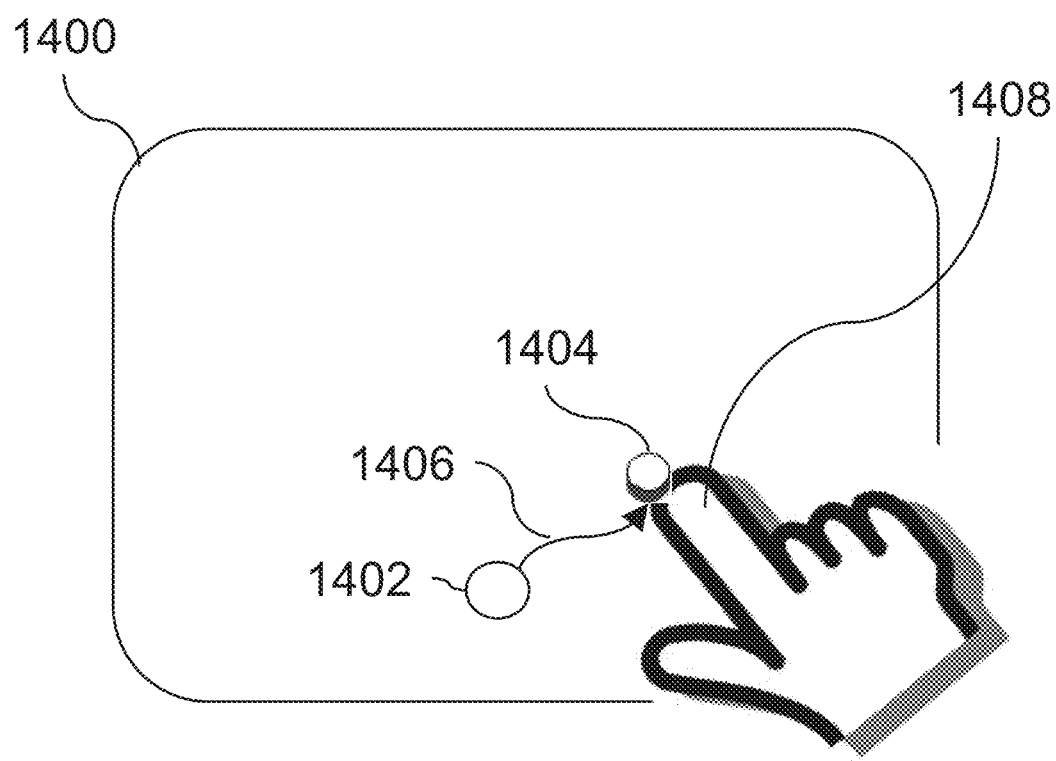
FIG. 11 is an illustration of a graphical user interface (GUI) implemented pursuant to the aspects of the disclosed embodiments.

Specifically, the present disclosure is related to performing a swiping operation on the graphical user interface of a gaming- and/or simulation-system, while controlling or facilitating operations on the interface. In FIG. 11, there is illustrated the swiping operation that can be performed on the graphical user interface of a gaming or simulation system, for controlling operations during playing a game or executing a simulation. As shown, for performing the swiping operation of the present disclosure, a finger 1408 of the user is initially placed at a desired point 1402, and moved along a desired path 1406, until a desired destination point 1404 in reached, in the normal fashion as it is done to operate menus and handle other applications in electronic devices incorporating touch-sensitive screens 1400.

Moreover, instead of using fingers, the swiping operation can also be performed through a mouse, by pointing and tapping the mouse initially at the point 1402, dragging the pointer on the screen along the desired path 1406, through the mouse, and finally releasing the mouse at the final position 1404. Further, any other display sensitive device or an organ, for example, a pen or a pointed device, can be used on the screen for performing the swiping operation. Connecting this operation and its advantages applicable on the typical farming environment depicted in FIG. 8 to FIG. 10, suppose a user wishes to grow raspberries all along a wide region represented by the path 1406 in FIG. 11, on different blocks on the farming field. Then, the user just needs to select the raspberry option that pops up, by pointing on any point along the path 1406, and swipe his/her fingers all along the path 1406. This operation will lead to easy and quicker growing of the raspberries along the entire path 1406.

Figure 12:
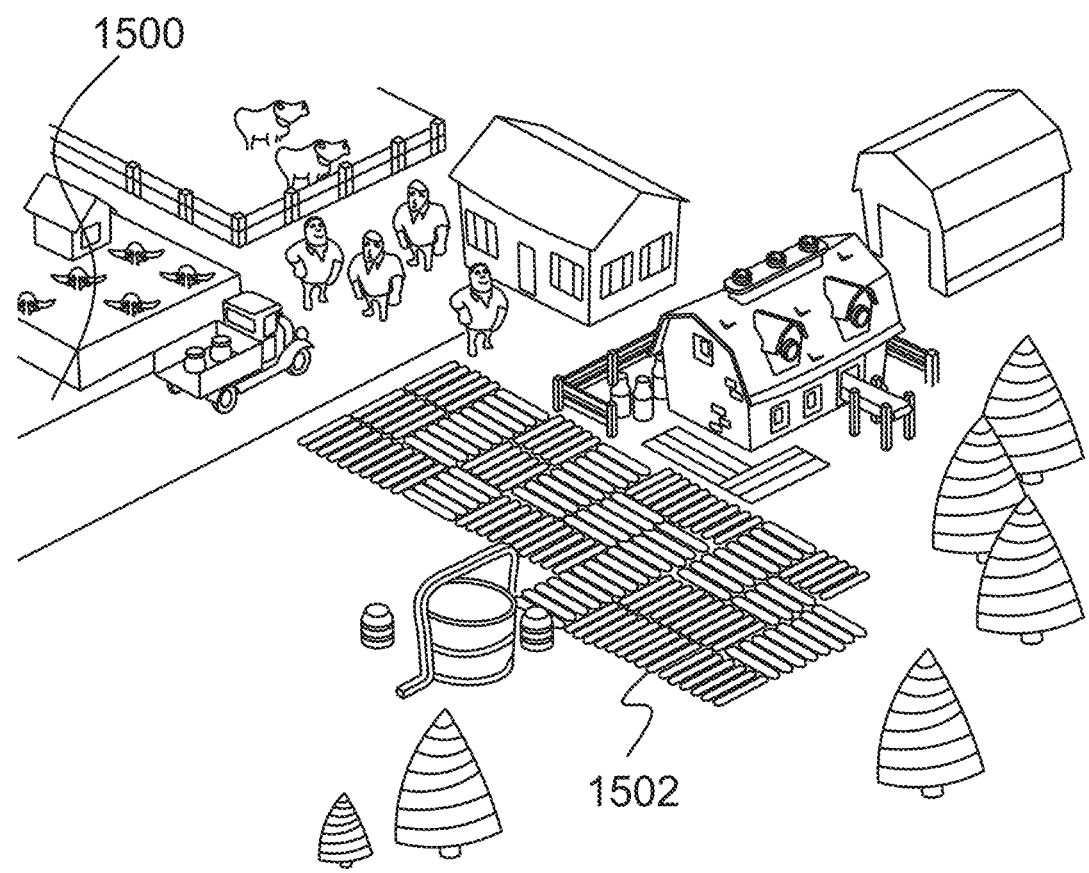
FIG. 12 to FIG. 15 are illustrations of farming environments which are generated by the system of FIG. 1.
Figure 13:
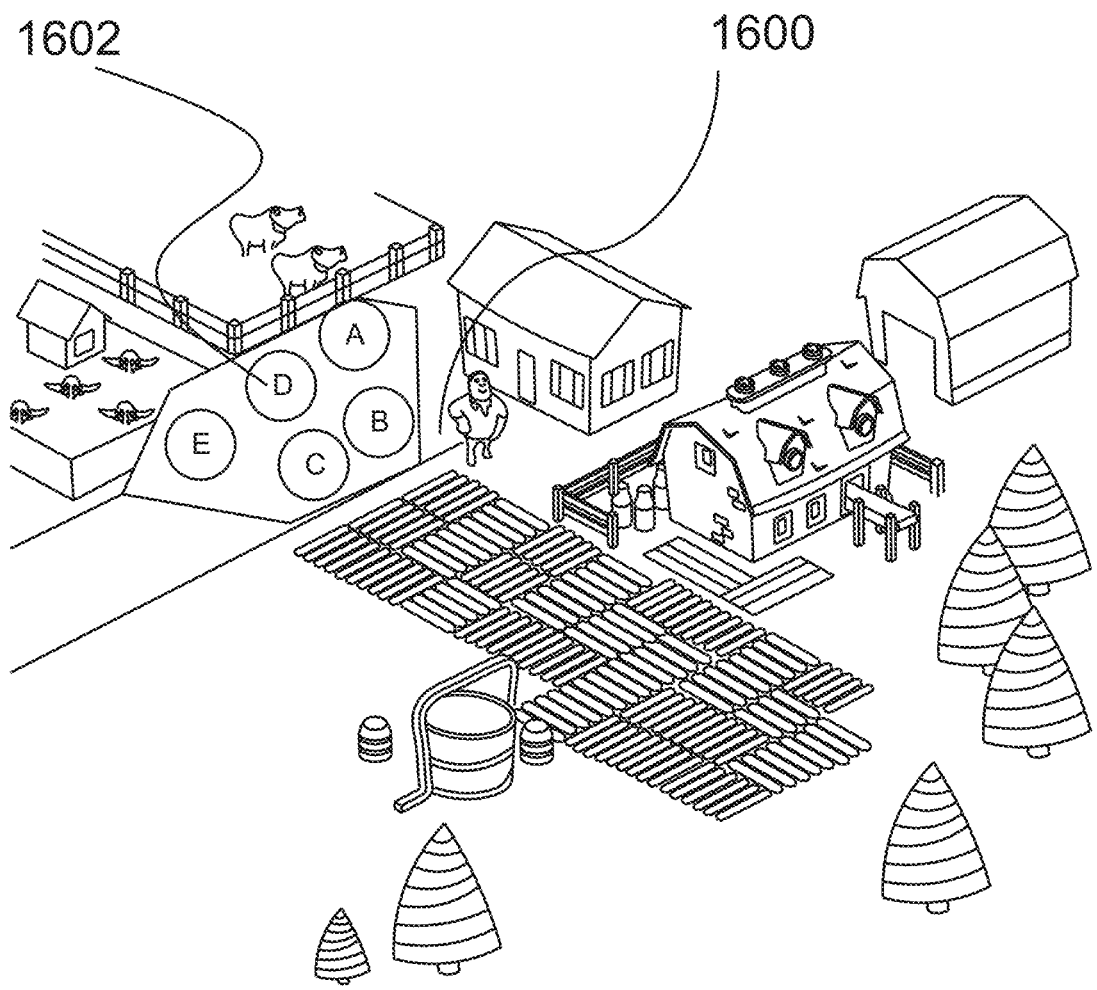
Figure 14:
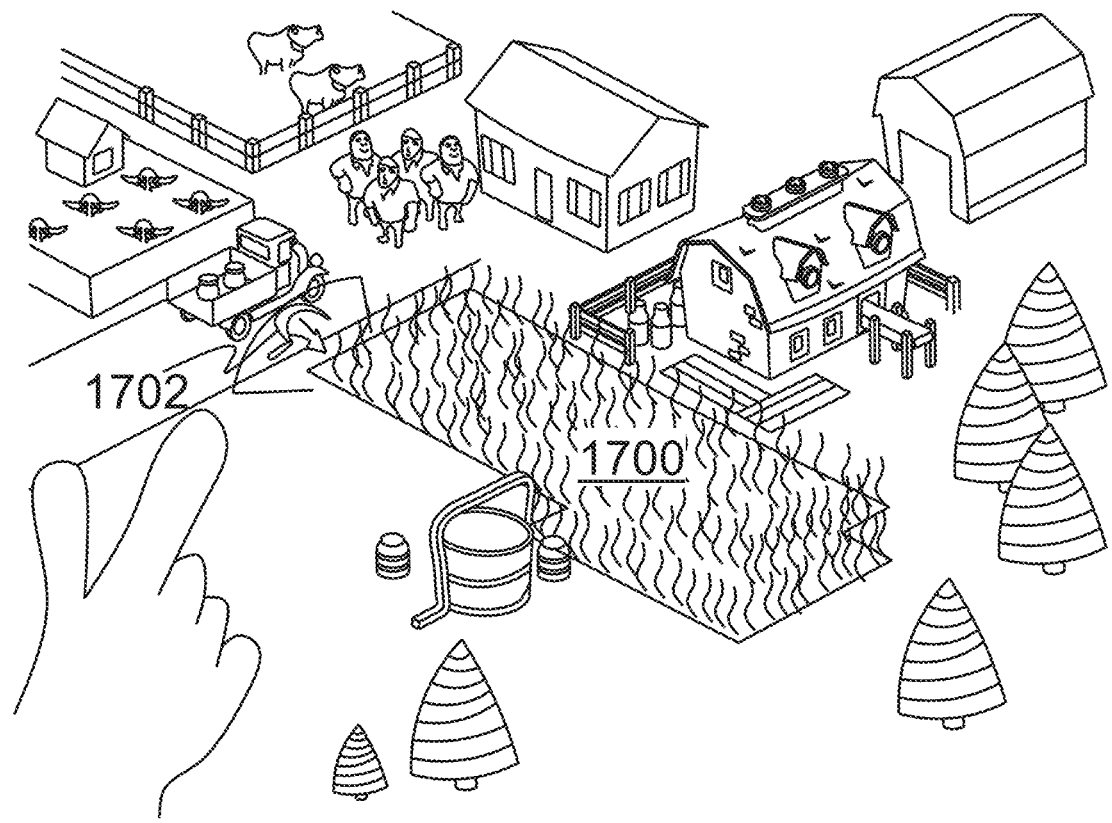
Figure 15:
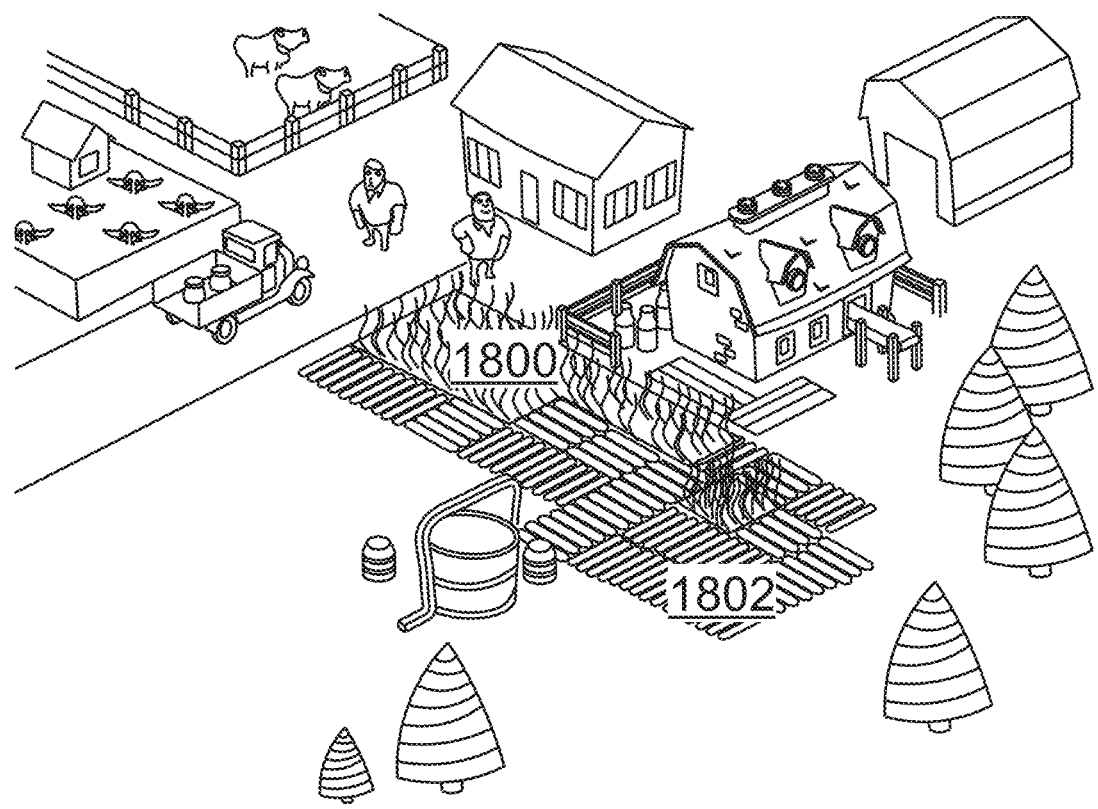

In FIG. 12 to FIG. 15, there is shown the view of the farming field shown earlier in FIG. 8, and the figures illustrate the advantages of the swiping feature supported by the graphical user interface of the present disclosure. As shown in FIG. 12, a view of a farm field 1500 is illustrated, and the object of the game or simulation is to score points or acquire credits by producing different products along different regions of the field 1500. Growing different crops/products, or performing different operations like harvesting or watering of different sections of the field 1500, carry different points or credits to be scored by the user. The field 1500 has different segments/blocks that can be modified by the user to score points or credits. These segments/blocks are represented by the different graphical objects of a graphical user interface which presents the gaming environment or the farm field 1500 on the display screen of an electronic device on which the game is being played, or the simulation is being executed. Referring next to FIG. 13, for growing a specific product/crop, the user has to click or tap through the mouse, or touch with his finger, or through a display sensitive object (in case where the screen of the electronic device is touch-sensitive), at a specific desired position, for example, the one represented by the block 1602, as shown. As the user touches the block 1602, an item specific menu (ISM) corresponding to the block 1602 appears on the graphical user interface. Different blocks may have different item specific menus, corresponding to the possible crops/products that can be grown over them. As shown, the ISM menu corresponding to block 1602 shows different user selectable options like A, B, C, D and E, which correspond to different crops that can be grown in the field. Each selectable option corresponds to a specific tool for growing a different kind of crop/product, for example, maize, corn, carrots, wheat and rice. The embodiment shown in the figures and described herein, is a mere example, and other embodiments incorporating obvious variations may also be possible, thus, not limiting the scope of the present disclosure. For example, there may be other different kind of tools present in the ISM menu, depending on the block/segment of the field clicked, tapped or selected. Specifically, if the selected block 1602 is already cultivated, then some of the selectable options appearing in the ISM menu may correspond to pesticide spray, harvesting, pouring water, and so forth. Referring next to FIG. 14, if the user decides to cultivate rice, for example, then he/she selects a suitable corresponding option from the ISM menu, and swipes his/her fingers all over the different blocks/segments of the field, wherever he/she desires to grow the rice. Eventually, as shown, the cultivated rice appears all over the region 1700 of the farm field, where the user has swiped his fingers, or dragged the mouse. As a further example to illustrate the application of swiping motion to other operations, if the user now wishes to harvest the grown rice in certain areas of the region 1700, then he/she taps, clicks or touches the region 1700, and one of the tools appears in another popping ISM menu, for sickle operation, as shown by the tool 1702. Continuing further in conjunction with FIG. 15, the user points his/her finger over the sickle tool, and swipes the finger over regions of the field where he/she wants to harvest the grown rice. Eventually, as shown, the user gets successful in harvesting and collecting rice from areas 1802, and has intentionally left the other areas free from being harvested.

Emphasizing on the advantages of the application of the swiping feature in the graphical user interface of a gaming system, as compared to the solutions as illustrated before through FIG. 8 to FIG. 10, all such operations like harvesting or cultivating in a farm field, for example, are easily done through the extremely quick and easily operable swiping action, which just takes a fraction of a second and avoids multiple clicking or tapping at different points on the interface, as was done in prior-art gaming or simulation systems. This eliminates any effects like deterioration of the display screen if the screen is touch sensitive, or avoids any complexities in performing different operations, irrespective of how big the farm field may be.

Figure 16:
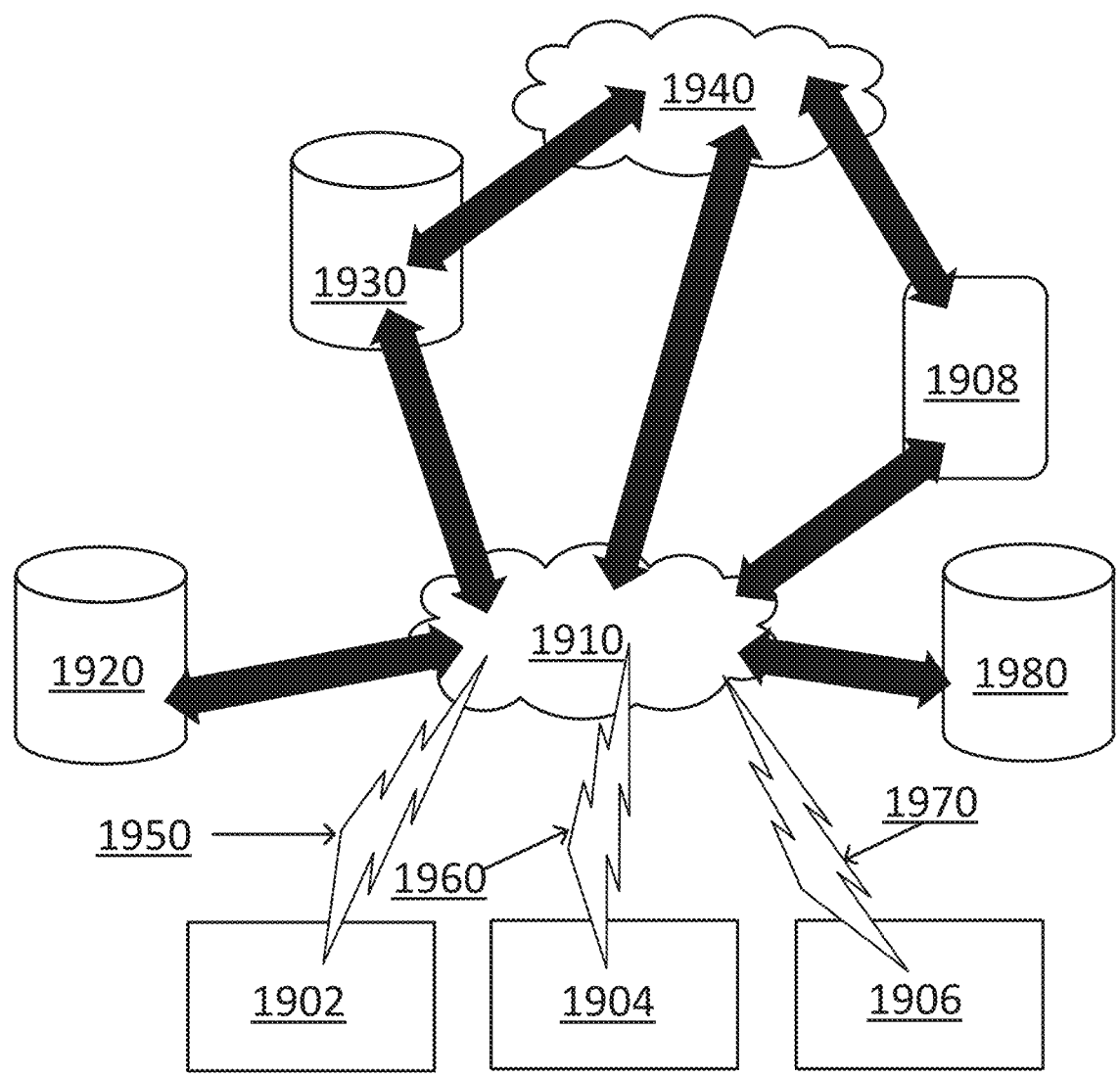
FIG. 16 is an alternative network of data servers and devices for implementing the system as illustrated in FIG. 1.

In FIG. 16, there is shown an exemplary environment for implementing the method and system in accordance with an aspect of the present disclosure. As shown, different electronic devices 1902, 1904, 1906 and 1908 are depicted, through which a user can connect to one of the different gaming or simulation servers 1910 and 1940, through one of the multiple networks represented by 1950, 1960 and 1970. The electronic devices 1902, 1904, 1906 or 1908, can be any suitable electronic devices having a computing hardware capable of supporting and executing a software product corresponding to a gaming and/or simulation system. Typical examples of the illustrated electronic devices may include a desktop computer, a laptop computer, a tablet computer, a smart phone including the predominantly known iPhones®, Android Phone® and so forth, an iPad, and so forth. Moreover, any of the electronic devices can have the touch-sensitive screen for obtaining user inputs through a touching operation, and some of them may also be coupled to, and operable through conventional devices like a mouse, a joystick, a keyboard, and so forth. Further, the different electronic devices 1902, 1904, 1906 and 1908, are commonly connected to each other through the servers 1910 and 1940, through suitable networks. The networks 1950, 1960 and 1970, and so forth, may be Wireless networks, for example a Wireless Local area network (WLAN), Local area networks, cellular networks, for example, 2G network, 3G network, and so forth. Furthermore, any of the electronic devices may also use its own Bluetooth network and Bluetooth server, to connect and synchronize with the other electronic devices; "Bluetooth" is a registered trademark. The exemplary environment facilitates multiple users to be online at the same time, and synchronize with each other, to enable multiplayer gaming. Additionally, multiple databases 1920, 1930, corresponding to the different servers, as illustrated, allow the different servers to store information relevant to the gaming or simulation environment, when the different users are online for multiuser gaming and/or simulation.

For a user player gaming or executing simulations, the user logs on through any of the electronic devices 1902, 1904, 1906 or 1908, and connects to one of the gaming or simulation servers 1910 or 1940, through a suitable network. As the user logs on, and executes the gaming or simulation software on the computing hardware of a specific device, for example, the device 1902, a graphical user interface corresponding to the game or simulation is generated and rendered on the display screen of the device 1902. The graphical user interface presents different graphical objects on the display screen of the device 1902. The graphical objects may be the different blocks/segments of the graphical user interface, on which different operations corresponding to the game being played, or the simulation being executed, can be performed. Moreover, a point object (cursor) movable over the different graphical objects appears on the graphical user interface, for controlling the gaming or simulation operations. If the device 1902 does not have a touch-sensitive screen, the pointer object may be controllable through a mouse, a joystick or a set of keyboard buttons, coupled to the device 1902. Furthermore, if the device 1902 has a touch-screen functionality incorporated therein, the same controlling operations can also be performed by swiping or tapping/clicking through fingers or any display sensitive item, like any other organ/pen/pencil.

Another database 1980 serves as a back-end database for the gaming or simulation server 1910. As the user of the device 1902 starts playing the game, or executing the simulation, typical actions and gestures performed by the user, are recorded in the back-end server 1980. Specifically, such actions are interpreted through the gaming or simulation server 1910, and are sent as messages to the back-end sever 1980, which eventually maintains a backup for the played game or executed simulation. Such messages can be in the form of data packages sent over an Internet connection through which the device 1902 is connected to the server 1910, or any other wireless or wired connection connecting the device 1902 to the server 1910. Typical elements of such messages for maintaining a back end for the game or simulation, may include a header, a payload and a checksum. The checksum can be a function of the payload, or it may be a unique user identifier, like the username, and so forth. The advantage of including the checksum in back-end maintaining message, is the possibility of avoiding prospective frauds while playing the game, or corruption in a simulation which could adversely influence results generated by the simulation. The back-end messages received by the server 1910 are also sent to the other databases 1920 and 1930 of the server 1910. In these databases, these back-end messages are used to maintain a continuous logic representing the status of the game or simulation, for example, the exact score of the player with time, and the stage of the game that the player has already reached. With a continuous receipt of the back-end messages by the databases 1920 and 1930, a regular updating of the game or simulation status is implemented within the server databases 1910 and 1920, eventually, with time. This ensures facilitating the resumption of the last status of the game or simulation, in a case of the device 1910 unexpectedly shutting down, the user changes the gaming or simulation terminal or intentionally quits playing or executing the simulation for a certain period, and logs in at some other time.

Although only two servers 1910 and 1940 have been shown, there can be multiple gaming or simulation servers coordinating with, and, connected to each other, for implementing the gaming or simulation environment in accordance with the present disclosure. Moreover, the environment, as illustrated in FIG. 16, is capable of being implemented as a thin client game or simulation, wherein a part of the gaming logic, or the simulation logic, may be stored in any of the servers 1910 and 1940, and a part of it may be stored in the gaming or simulation terminal. The depicted environment also supports a thick client game or simulation, wherein the entire gaming logic, or simulation logic, may be stored in the gaming or simulation terminal. Furthermore, the game can be completely web-based too, wherein most of the gaming logic or simulation logic may be stored in any of the servers 1910 or 1940. The aspects of the disclosed embodiments are optionally implemented via a cloud-computing infrastructure.

Although, the gaming or simulation system implementable through the illustrated gaming or simulation environment, has been explained in the case when a single user logs on to any of the electronic devices 1902, 1904, 1906 or 1908, the same environment is capable of supporting multiuser gaming or simulation, wherein different users may log on through different electronic devices, and synchronize with each other by connecting to the common servers 1910 and 1940 through suitable networks, and share a common graphical user interface representing the ongoing game or simulation, for example a United Nations famine relief programme. In such embodiments, the graphical user interface rendered on the display screens of the different electronic devices, is regularly updated, concurrently, through the logic data stored in the databases 1920 and 1930 of the gaming or simulation servers, at the back-end.

In the foregoing, pressure applied by a given user to a touch-screen is beneficially determined by one or more pressure-sensitive transducers integrated into the touch-screen. However, certain contemporary touch-screens operate only on a binary basis, namely either there is contact or no contact with a given area of the touch-screen. In such touch-screens, pressure applied by the given user can be determined by an area of neighbouring spatially contiguous sensing points on the screen which substantially simultaneously experience a contact being made by the given user. Thus, progressively more spatially contiguous sensing points are substantially simultaneously in contact state as progressively more pressure is applied due to elastic deformation of biological tissue of the given user's finger tips. A similar pressure sensing functionality can be achieved when the given user employs a pointing device having an elastically deformable end to contact onto the touch-screen to control a game or a simulation, or to enter commands for controlling a real technical facility.

Beneficially, when a game or simulation is implemented as described in the foregoing and the given user exits from the game or simulation, for example for resumption at a later time, parameters describing a state of the game or simulation at an instant of exiting from the game are beneficially stored in data memory, so that the state of the game or simulation can be restored again at resumption of the game or simulation.

Modifications to embodiments of the invention described in the foregoing are possible without departing from the scope of the invention as defined by the accompanying claims. Expressions such as "including", "comprising", "incorporating", "consisting of", "have", "is" used to describe and claim the aspects of the disclosed embodiments are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A gaming device comprising:
a graphical user interface; and
a processor configured to execute non-transitory machine readable instructions embodied on a software product, wherein execution of the non-transitory machine readable instructions by the processor is configured to:
detect a selection of a graphical object from a first area on a graphical user interface, the graphical object having an effect to be performed on a target object associated therewith;
provide an indication on the graphical user interface that the selection of the graphical object is active;
detect a single swipe touching in a second area away from the first area on the graphical user interface proximate to the target object presented in the second area of the graphical user interface while the selection of the graphical object is active, the single swipe touching defining a path in the second area of the graphical user interface, the second area of the graphical user interface representing a playing area for a game;
generate a first representation of the selected graphical object at a first point along the path and at least one second representation of the selected graphical object at at least one second point along the path, the first representation and the at least one second representation being generated along the path at a same time instance;
apply the effect of the selected graphical object on the target object;
change a state of the target object based on a function of the effect at an expiration of a pre-determined period of time.

2. The gaming device according to claim 1, wherein the graphical user interface is a touch sensitive display.

3. The gaming device according to claim 1, wherein a number of the at least one second representations of the graphical object is dependent upon a detected speed of the swipe touching.

4. The gaming device according to claim 3, wherein the number of the at least one second representations increases as the detected speed increases.

5. The gaming device according to claim 1 wherein execution of the non-transitory machine readable instructions by the processor further causes the processor to:
detect a second swipe touching defining a second path along the second areaportion of the graphical user interface; and
generate a plurality of representations of the graphical object at a plurality of points along the second path.

6. The gaming device according to claim 1, wherein the execution of the non-transitory machine readable instructions by the processor is further configured to cause the processor to:
detect a time duration of the swipe touching; and
only generate the first representation of the graphical object and the at least one second representation of the graphical object if the time duration exceeds a pre-determined time duration.

7. The gaming device according to claim 1, wherein the execution of the non-transitory machine readable instructions by the processor is further configured to cause the processor to, prior to detecting the swipe touching:
detect a movement of a pointer object near the target object;
generate a pop-up menu, the pop-up menu containing a list of one or more graphical objects associated with the target object, wherein individual ones of the one or more graphical objects are associated with an effect that can be applied to the target object; and
wherein the graphical object is selected from the pop-up menu.

8. The gaming device according to claim 1, wherein the execution of the non-transitory machine readable instructions by the processor is further configured to cause the processor to:
detect another swipe touching over a portion of the target object; and
continuously apply the effect of the graphical object to the target object from the first representation and the at least one second representation.

9. The gaming device according to claim 8, wherein the execution of the non-transitory machine readable instructions by the processor is further configured to cause the processor to:
terminate an application of the effect when a termination of the another swipe touching is detected.

10. A method of facilitating user interactions with a graphical user interface, the graphical interface being generated and rendered on the display of a gaming device, by executing non-transitory machine readable instructions on a processor of the gaming device, the processor, graphical user interface and the non-transitory machine readable instructions being implemented on the gaming device, the method comprising:

detecting a selection of a graphical object from a first area on a graphical user interface, the graphical object having an effect to be performed on a target object associated therewith;

provide an indication on the graphical user interface that the selection of the graphical object is active;

detecting a single swipe touching in a second area away from the first area on the graphical user interface proximate to the target object presented in the second area of the graphical user interface while the selection of the graphical object is active, the single swipe touching defining a path in the second area of the graphical user interface, the second area of the graphical user interface representing a playing area for a game;

generating a first representation of the selected graphical object at a first point along the path and at least one second representation of the selected graphical object at at least one second point along the path, the first representation and the at least one second representation being generated along the path at a same time instance;

applying the effect of the selected graphical object on the target object;

changing a state of the target object based on a function of the effect at an expiration of a pre-determined period of time.

11. The method according to claim 10, wherein a number of the at least one second representations of the graphical object is dependent upon a detected speed of the swipe touching.

12. The method according to claim 11, wherein the number of the at least one second representations increases as the detected speed increases.

13. The method according to claim 10 wherein execution of the non-transitory machine readable instructions by the processor further causes the processor to:

detect a second swipe touching defining a second path along the second area of the graphical user interface; and generate a plurality of representations of the graphical object at a plurality of points along the second path.

14. The method according to claim 10, wherein the execution of the non-transitory machine readable instructions by the processor is further configured to:

detect a time duration of the swipe touching; and only generate the first representation of the graphical object and the at least one second representation of the graphical object if the time duration exceeds a pre-determined time duration.

15. The gaming device according to claim 10, wherein the execution of the non-transitory machine readable instructions by the processor is further configured to cause the processor to, prior to detecting the swipe touching:

detect a movement of a pointer object near the target object;

generate a pop-up menu, the pop-up menu containing a list of one or more graphical objects associated with the target object, wherein individual ones of the one or more graphical objects are associated with an effect that can be applied to the target object; and wherein the graphical object is selected from the pop-up menu.

16. The method according to claim 10, wherein the execution of the non-transitory machine readable instructions by the processor is further configured to cause the processor to:

detect another swipe touching over a portion of the target object; and continuously apply the effect of the graphical object to the target from the first representation and the at least one second representation.

17. The method according to claim 16, wherein the execution of the non-transitory machine readable instructions by the processor is further configured to cause the processor to:

terminate an application of the effect when a termination of the another swipe touching is detected.

* * * * *